(12) United States Patent
Yamakado et al.

(10) Patent No.: US 7,080,435 B2
(45) Date of Patent: Jul. 25, 2006

(54) RECYCLING FACILITATING SYSTEM, RECYCLING FACILITATING PROGRAM, AND RECYCLING FACILITATING METHOD

(75) Inventors: Hitoshi Yamakado, Hino (JP); Gu Yu, Hino (JP); Toru Miyamoto, Hino (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 10/756,424

(22) Filed: Jan. 14, 2004

(65) Prior Publication Data
US 2004/0194273 A1    Oct. 7, 2004

(30) Foreign Application Priority Data
Jan. 27, 2003 (JP) ............... 2003-017414
Feb. 21, 2003 (JP) ............... 2003-044353
Feb. 21, 2003 (JP) ............... 2003-044354

(51) Int. Cl.
  *B23P 19/04* (2006.01)
  *B21D 17/00* (2006.01)
(52) U.S. Cl. ................... 29/403.3; 29/407.1
(58) Field of Classification Search ........... 29/403.3, 29/407.1, 403.1, 426.1, 700, 701, 703; 700/95, 700/7
See application file for complete search history.

(56) References Cited

U.S. PATENT DOCUMENTS

| | | | |
|---|---|---|---|
| 6,529,788 B1 * | 3/2003 | Tani et al. | 700/97 |
| 2004/0210334 A1 * | 10/2004 | Tateishi et al. | 700/106 |
| 2004/0215360 A1 * | 10/2004 | Yamakado et al. | 700/95 |

FOREIGN PATENT DOCUMENTS

JP    A 2002-197147    7/2002

* cited by examiner

*Primary Examiner*—John C. Hong
(74) *Attorney, Agent, or Firm*—Oliff Berridge, PLC

(57) ABSTRACT

A recycling facilitating system including an item identification data input unit for inputting item identification data, an item disassembly data memory for storing item disassembly data in correspondence with the item identification data, an item disassembly data retrieval unit for retrieving the item disassembly data, a disassembly diagram constructing unit for constructing the disassembly diagram based on the item disassembly data, and a disassembly diagram output unit for outputting the disassembly diagram; the disassembly diagram constructing unit determines the progress status of an operation step of disassembling the item to be recycled by identifying a component that was removed during the operation step, and, in accordance with the progress status, constructs one of a plurality of disassembly diagrams, which can be constructed from the item disassembly data that was retrieved by the item disassembly data retrieval unit.

6 Claims, 20 Drawing Sheets

FIG. 21
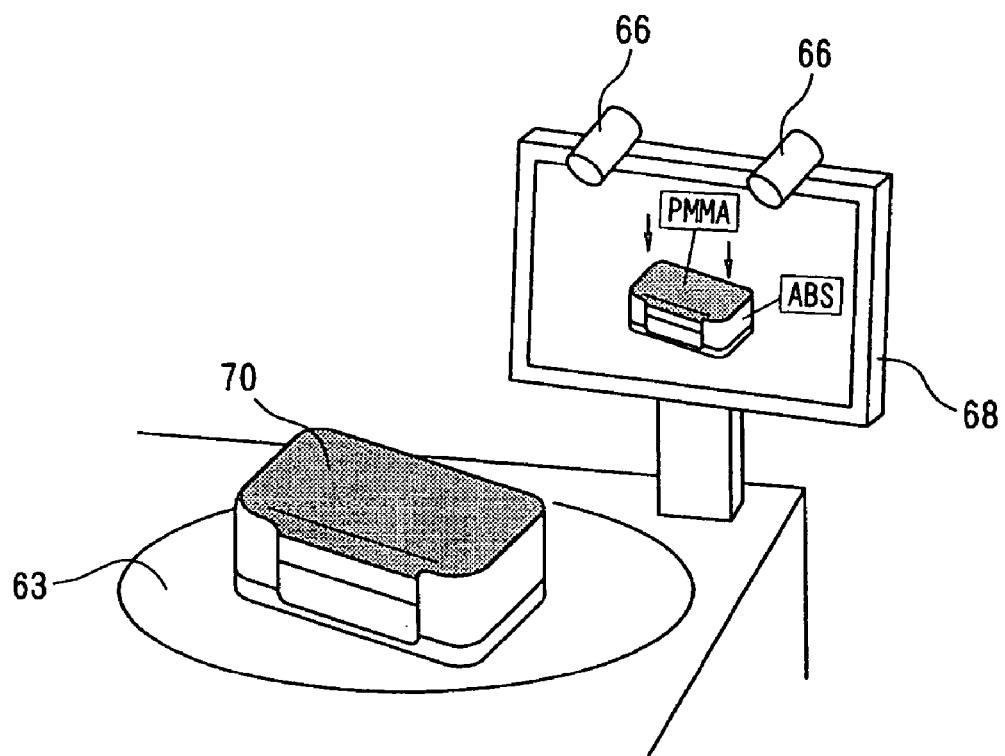
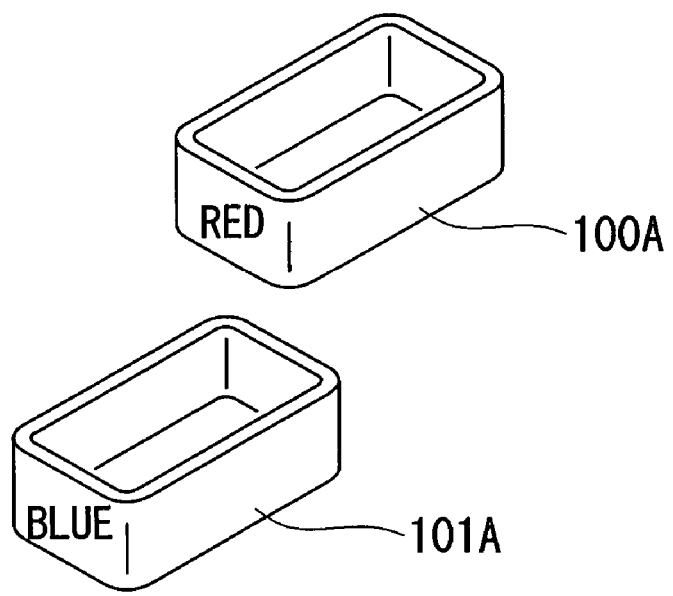

| MATERIAL | DISPLAY PATTERN |
|---|---|
| PMMA | 1 |
| ABS | 2 |
| POM | 3 |
| HARD PVC | 4 |
| PS | 5 |
| ⋮ | ⋮ |
| ALUMINIUM | 11 |
| IRON | 12 |
| COPPER | 13 |
| ALLOY | 14 |
| ⋮ | ⋮ |

| RECYCLE PROCESSING METHOD | DISPLAY COLOR | MATERIAL |
|---|---|---|
| PROCESSING METOD A | RED | PS, ABS, PMMA |
| PROCESSING METOD B | BLUE | POM, HARD PVC |
| PROCESSING METOD C | YELLOW | ALUMINIUM |
| PROCESSING METOD D | PINK | IRON |
| ⋮ | ⋮ | ⋮ |

RECYCLING FACILITATING SYSTEM, RECYCLING FACILITATING PROGRAM, AND RECYCLING FACILITATING METHOD

BACKGROUND OF THE INVENTION

Priority is claimed on Japanese Patent Application No. 2003-017414, filed Jan. 27, 2003; Japanese Patent Application No. 2003-044353, filed Feb. 21, 2003; and Japanese Patent Application No. 2003-044354, filed Feb. 21, 2003; and the contents thereof are incorporated herein by reference.

1. Field of the Invention

The present invention relates to a system for facilitating disassembly of an item to be recycled, such as an OA product or an electrical household appliance, and in particular relates to a recycling facilitating system, a recycling facilitating program, and a recycling facilitating method, which can perform efficient disassembly.

2. Description of Related Art

Conventionally, a recycling method such as that disclosed in, for example, Japanese Patent Application No. 2002-197147 is used in facilitating disassembly of an item to be recycled, such as an OA product or an electrical household appliance.

This is a method for recycling components and materials of an item to be recycled, and is performed by the following steps (a) to (g).

(a) Items to be recycled, arising in a specified areas, are conveyed to a specified collection site and stored there.

(b) The specified collection site has an input section for reading first appliance data that is appended to the item to be recycled, and a memory for storing a disassembly database including data required to compare, disassemble, and classify, the item to be recycled. At the specified collection site, the first appliance data of the item to be recycled, obtained in the input section, is compared with a corresponding disassembly database.

(c) Based on the comparison between the first appliance data of the items to be recycled and the disassembly database, the items to be recycled are classified into a plurality of first categories, and classification data relating to the items to be recycled is stored in the disassembly database.

(d) The specified collection site identifies disassembly processing outside member data and non-disassembly processing member data of the items to be recycled, which have been classified into the plurality of first categories, based on the first product data and the disassembly database, displays the identification result in a display section, and stores the disassembly processing outside member data and the non-disassembly processing member data in the disassembly database.

(e) Based on the result displayed in the display section, the items to be recycled are disassembled into disassembly processing outside members and non-disassembly processing members, and the disassembly processing outside members are classified into a plurality of second categories.

(f) With regard to the non-disassembly processing members and the disassembly processing outside members, which have been classified into the plurality of second categories, the disassembly processing outside members are conveyed to each material maker, and the non-disassembly processing members are conveyed to each product maker, and accumulated there.

(g) The accumulated disassembly processing outside members are worked into reproduction materials using a processing method, based on the disassembly database, and data relating to the reproduction materials is stored in the disassembly database.

Then, the disassembly database is made communal for the specified collection site, the material makers, and the product makers, via a network.

In the conventional recycling method described above, based on the result displayed in the display section, the items to be recycled are disassembled into non-disassembly processing members and disassembly processing outside members. More specifically, at first, the disassembly data is displayed in the display section, and, based on the displayed disassembly data, the outside members and body section of the items to be recycled are disassembled. At this time, in the disassembly data comprises disassembly data relating to the outside members and body sections of the items to be recycled, and recycle data and reuse data relating to the outside members and the body sections, this data containing at least the type of material used in the outside members and body sections, the name of the material maker of the outside members and the body sections, the name of the maker of the item to be recycled from the outside members and the body sections, the name of the outside members and the body sections, and the member number of the outside members and the body sections.

However, there is a problem that it is difficult for the operator who performs the disassembly to determine how exactly to disassembly the items to be recycled based only on this type of disassembly data.

Furthermore, it is desirable that the disassembly operator determines an appropriate sequence in accordance with the progress of the disassembly operation, but this requires sufficient prior experience, and, when there is an enormous number of categories of items to be recycled, even an experienced operator will be limited in his ability to determine the appropriate sequence. Even if the operator refers to a manual or the like illustrating the disassembly sequence for each item to be recycled, when there is an enormous number of categories or items to be recycled, time is consumed in referring to the manual or the like, limiting his efficiency. The same problem arises when the disassembly processes are complex, since it takes time to refer to the manual or the like.

SUMMARY OF THE INVENTION

Accordingly, the present invention was made in view of the unsolved difficulties of the conventional methods described above, and the object thereof is to provide a recycling facilitating system, a recycling facilitating program, and a recycling facilitating method, which enable the efficient disassembly work.

In order to achieve the above objects, a recycling facilitating system of the present invention is for facilitating disassembly of an item to be recycled, including: an item identification data input unit, through which item identification data for identifying the item to be recycled is input; an item disassembly data memory, which stores item disassembly data for constructing a plurality of different disassembly diagrams showing steps of disassembling the item to be recycled in correspondence with the item identification data; an item disassembly data retrieval unit, which retrieves the item disassembly data from the item disassembly data memory based on the item identification data that was input by the item identification data input unit; a disassembly diagram constructing unit, which constructs the disassembly diagram based on the item disassembly data that was retrieved by the item disassembly data retrieval unit; and a disassembly diagram output unit, which outputs the disassembly diagram that was constructed by the disassembly diagram constructing unit, wherein the disassembly diagram constructing unit determines the progress status of an operation step of disassembling the item to be recycled by identifying a component that was removed during the operation step, and, in accordance with the progress status which was identified, constructs one of a plurality of disassembly diagrams, which can be constructed from the item disassembly data that was retrieved by the item disassembly data retrieval unit.

According to this constitution, when disassembling the item to be recycled, at first, item identification (ID) data for identifying the item to be recycled is input by the item ID data input unit. When the item ID data input unit has input the item ID data, the item disassembly data retrieval unit retrieves item disassembly data from the item disassembly data memory, based on the input item ID data. As a result, when the item disassembly data is retrieved, the disassembly diagram constructing unit constructs one of a plurality of disassembly diagrams, which can be constructed from the item disassembly data that was retrieved by the item disassembly data retrieval unit, in accordance with the progress of the disassembly operation of the item to be recycled. Then disassembly diagram output unit outputs the disassemble diagram.

The disassembly operator can carry out the disassembly operation while referring to the output disassembly diagram. Since disassembly diagrams are output one after another in accordance with the progress of the disassembly operation, little time or effort is required in referring to the next disassembly diagram. In particular, since the operation progresses while identifying components that have been removed, the progress of the operation can be determined accurately.

Consequently, the disassembly operator can ascertain the specific disassembly procedures for disassembling the item to be recycled from the disassembly diagram, and can ascertain comparatively appropriate procedures in accordance with the progress of the disassembly operation with little time or effort; thereby enabling the disassembly operation to be carried out more efficiently than in conventional systems.

The disassembly diagram is a drawing or text, which illustrates procedures for proceeding from one step of the operation of disassembling the item to be recycled to the next step.

The disassembly diagram output unit may output the disassembly diagram using a method that can be comprehended by the senses, such as display or printing, or may output the disassembly diagram as data.

The item disassembly data includes data for constructing a plurality of different disassembly diagrams, which may all be constructed as drawings, or all as text, or some as drawings and some as text, or a combination of drawings and text.

The item disassembly data memory stores item disassembly data in various ways and at various times; the item disassembly data may be stored beforehand, or input from the outside and the like when the system is operating.

The recycling facilitating system of the present invention may identify the removed component by comparing an image of the removed component with an image created from CAD data of candidate components.

According to this constitution, the progress of the steps can be determined accurately and automatically, enabling the disassembly operator to work in compliance with the commands displayed in the disassembly diagrams without needing to store any data for identifying the component beforehand, and thereby lightening the burden of his work.

Furthermore, recycling facilitating system of the present invention may identify the removed component by detecting a reduction in weight of the item to be recycled, and comparing a weight corresponding to the reduction with weights of candidate components.

According to this constitution, the progress of the steps can be determined accurately and automatically, enabling the disassembly operator to work in compliance with the commands displayed in the disassembly diagrams without needing to store any data for identifying the component beforehand, and thereby lightening the burden of his work.

The recycling facilitating system of the present invention may identify the removed component by reading component identification written in an RFID tag appended to the removed component.

According to this constitution, the progress of the steps can be determined accurately and automatically, enabling the disassembly operator to work in compliance with the commands displayed in the disassembly diagrams without needing to store any data for identifying the component beforehand, and thereby lightening the burden of his work.

In another arrangement, a recycling facilitating system of the present invention is for facilitating disassembly of an item to be recycled, including: an item identification data input unit, through which item identification data for identifying the item to be recycled is input; an item disassembly data memory, which stores item disassembly data for constructing a plurality of different disassembly diagrams showing steps of disassembling the item to be recycled in correspondence with the item identification data; an item disassembly data retrieval unit, which retrieves the item disassembly data from the item disassembly data memory based on the item identification data that was input by the item identification data input unit; a disassembly diagram constructing unit, which constructs the disassembly diagram based on the item disassembly data that was retrieved by the item disassembly data retrieval unit; and a disassembly diagram output unit, which outputs the disassembly diagram that was constructed by the disassembly diagram constructing unit, wherein the disassembly diagram constructing unit determines the progress status of an operation step of disassembling the item to be recycled by identifying a tool that was used during the operation step, and, in accordance with the progress status which was identified, constructs one of a plurality of disassembly diagrams, which can be constructed from the item disassembly data that was retrieved by the item disassembly data retrieval unit.

According to this constitution, when disassembling the item to be recycled, at first, item ID data for identifying the item to be recycled is input by the item ID data input unit. When the item ID data input unit has input the item ID data, the item disassembly data retrieval unit retrieves item disassembly data from the item disassembly data memory, based on the input item ID data. As a result, when the item disassembly data is retrieved, the disassembly diagram constructing unit constructs one of a plurality of disassembly diagrams, which can be constructed from the item disassembly data that was retrieved by the item disassembly data retrieval unit, in accordance with the progress of the disassembly operation of the item to be recycled. Then disassembly diagram output unit outputs the disassemble diagram.

The disassembly operator can carry out the disassembly operation while referring to the output disassembly diagram. Since disassembly diagrams are output one after another in accordance with the progress of the disassembly operation, little time or effort is required in referring to the next disassembly diagram. In particular, since the operation progresses while identifying tools that were used, the progress of the operation can be determined accurately.

Consequently, the disassembly operator can ascertain the specific disassembly procedures for disassembling the item to be recycled from the disassembly diagram, and can ascertain comparatively appropriate procedures in accordance with the progress of the disassembly operation with little time or effort; thereby enabling the disassembly operation to be carried out more efficiently than in conventional systems.

The disassembly diagram is a drawing or text, which illustrates procedures for proceeding from one step of the operation of disassembling the item to be recycled to the next step.

The disassembly diagram output unit may output the disassembly diagram using a method that can be comprehended by the senses, such as display or printing, or may output the disassembly diagram as data.

The item disassembly data comprises data for constructing a plurality of different disassembly diagrams, which may all be constructed as drawings, or all as text, or some as drawings and some as text, or a combination of drawings and text.

The item disassembly data memory stores item disassembly data in various ways and at various times; the item disassembly data may be stored beforehand, or input from the outside and the like when the system is in operation.

In the recycling facilitating system of the present invention, the tool is identified by detecting its position, and the number of times it was used, from images.

According to this constitution, the progress of steps can be determined accurately and automatically, enabling the disassembly operator to work in compliance with the commands displayed in the disassembly diagrams without needing to store any data for identifying the component beforehand, and thereby lightening the burden of his work.

Furthermore, the recycling facilitating system of the present invention may identify the tool based on the status of its switch, in addition to its position and the number of times it was used, in the case in which the tool is an electric tool.

According to this constitution, the progress of steps can be determined accurately and automatically, enabling the disassembly operator to work in compliance with the commands displayed in the disassembly diagrams without needing to store any data for identifying the component beforehand, and thereby lightening the burden of his work.

Another aspect of the present invention provides a recycling facilitating system for facilitating disassembly of an item to be recycled, including: an item identification data input unit, through which item identification data for identifying the item to be recycled is input; an item disassembly data memory, which stores item disassembly data for constructing a plurality of different disassembly diagrams showing steps of disassembling the item to be recycled in correspondence with the item identification data; an item disassembly data retrieval unit, which retrieves the item disassembly data from the item disassembly data memory based on the item identification data that was input by the item identification data input unit; a disassembly diagram constructing unit, which constructs the disassembly diagram based on the item disassembly data that was retrieved by the item disassembly data retrieval unit; and a disassembly diagram output unit, which outputs the disassembly diagram that was constructed by the disassembly diagram constructing unit, wherein the disassembly diagram constructing unit constructs the disassembly diagram so that a component to be disassembled in each disassembly step can be identified.

According to this constitution, when disassembling the item to be recycled, at first, item ID data for identifying the item to be recycled is input by the item ID data input unit. When the item ID data input unit has input the item ID data, the item disassembly data retrieval unit retrieves item disassembly data from the item disassembly data memory, based on the input item ID data. As a result, when the item disassembly data is retrieved, the disassembly diagram constructing unit constructs one of a plurality of disassembly diagrams, which can be constructed from the item disassembly data that was retrieved by the item disassembly data retrieval unit, in accordance with the progress of the disassembly operation of the item to be recycled. Then disassembly diagram output unit outputs the disassemble diagram.

The disassembly operator can carry out the disassembly operation while referring to the output disassembly diagram. Since disassembly diagrams are output one after another in accordance with the progress of the disassembly operation, little time or effort is required in referring to the next disassembly diagram.

Consequently, the disassembly operator can ascertain the specific disassembly procedures for disassembling the item to be recycled from the disassembly diagram, and can ascertain comparatively appropriate procedures in accordance with the progress of the disassembly operation with little time or effort; thereby enabling the disassembly operation to be carried out more efficiently than in conventional systems.

The disassembly diagram is a drawing or text, which illustrates procedures for proceeding from one step of the operation of disassembling the item to be recycled to the next step.

The disassembly diagram output unit may output the disassembly diagram using a method that can be comprehended by the senses, such as display or printing, or may output the disassembly diagram as data.

The item disassembly data comprises data for constructing a plurality of different disassembly diagrams, which may all be constructed as drawings, or all as text, or some as drawings and some as text, or a combination of drawings and text.

The item disassembly data memory stores item disassembly data in various ways and at various times; the item disassembly data may be stored beforehand, or input from the outside and the like when the system is in operation.

In the recycling facilitating system of the present invention, the disassembly diagram constructing unit may change a display pattern for each material of components to be disassembled in the disassembly diagram.

This constitution enables the materials to be easily identified.

Furthermore, in the recycling facilitating system of the present invention, the disassembly diagram constructing unit may change the display color of each recycle processing method of components to be disassembled in the disassembly diagram.

This constitution enables the recycle processing methods to be classified easily.

Furthermore, in the recycling facilitating system of the present invention, the display colors may be the same colors as component collecting boxes, which are allocated for each recycle processing method.

This constitution enables the disassembled components to be delivered to the collecting boxes more reliably, and prevents them from being mistakenly classified.

BRIEF DESCRIPTION OF THE DRAWINGS

FIG. 21 is a diagram showing the arrangement constitution of the image-capturing device 66 and the display device 68 in the third embodiment.

DETAILED DESCRIPTION OF THE INVENTION

THE FIRST EMBODIMENT

The first embodiment of the present invention will be explained with reference to the diagrams. FIGS. 1 to 15 show a recycling facilitating system, a recycling center, a data management center, a program for the center (recycling facilitating program), and a recycling facilitating method, according to the present invention.

Figure 1:
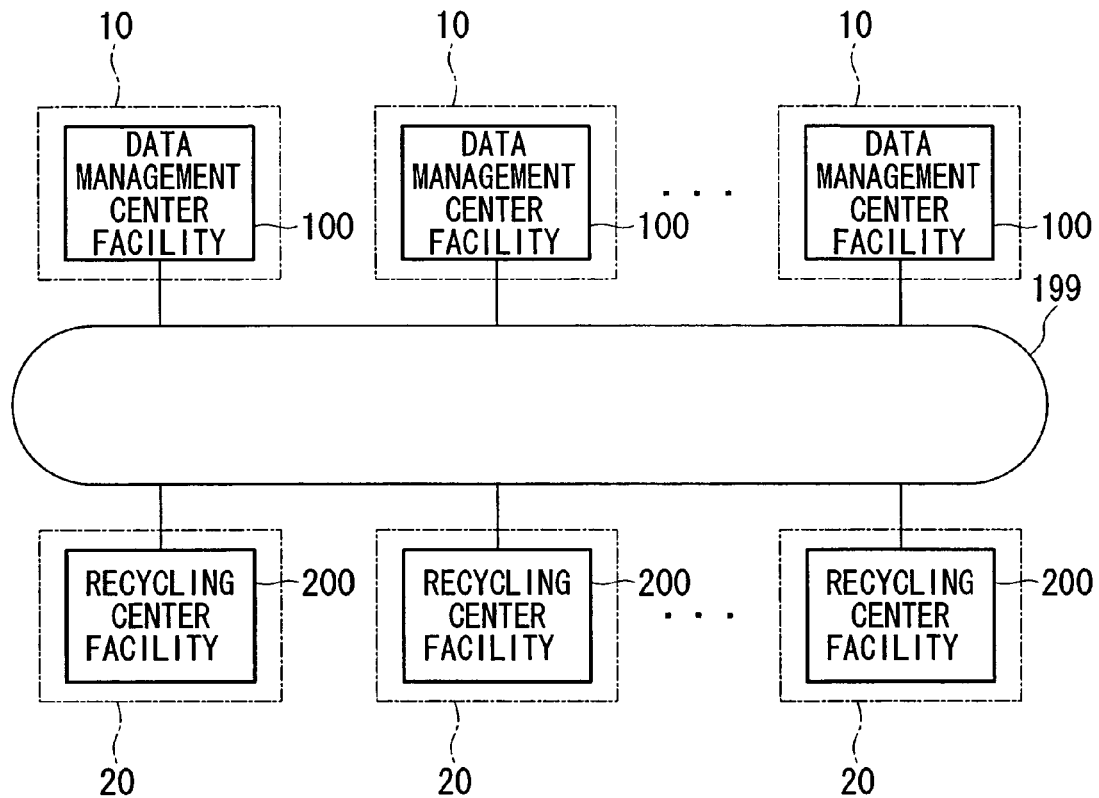
FIG. 1 shows a first embodiment of the present invention, and is a block diagram showing the constitution of a network system implementing the present invention.

As shown in FIG. 1, the present embodiment utilizes the recycling facilitating system, the recycling center, the data management center, and the program for center (recycling facilitating program) of the present invention in a case where items to be recycled, such as OA products and electrical household appliances, are disassembled and classified at a recycling center 20.

At first, the constitution of a network system of the present embodiment will be explained with reference to FIG. 1. FIG. 1 is a block diagram showing the constitution of the network system of the present embodiment.

As shown in FIG. 1, a plurality of data management centers 10 and a plurality of recycling centers 20 are provided in each region. Each data management center 10 has a data management center facility 100, each recycling center 20 has a recycling center facility 200, and the data management center facilities 100 and the recycling center facilities 200 are connected via an internet 199 so that they can transmit and receive communications between each other.

Subsequently, the constitution of the data management center facility 100 will be explained with reference to FIG. 2.

Figure 2:
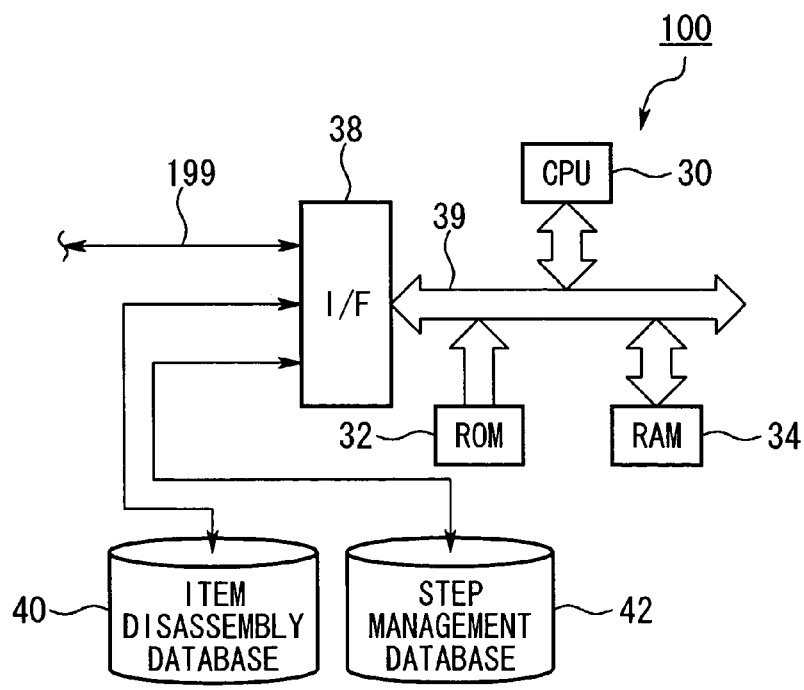
FIG. 2 is a block diagram showing the constitution of a data management center 100 in the first embodiment.

FIG. 2 is a block diagram showing the constitution of the data management center facility 100.

As shown in FIG. 2, the data management center facility 100 comprises a CPU 30 that makes computations based on a control program and controls the entire system, a ROM 32 that stores a control program and the like for the CPU 30 beforehand in a predetermined region, a RAM 34 for storing data read from the ROM 32 and computation results, which are required in the computation processes of the CPU 30, and an I/F 38 that acts as a medium for inputting and outputting data to and from outside devices; these components are connected to each other so as to be able to receive data by a bus 39, which is a signal line for transferring the data.

An item disassembly database 40, which stores item disassembly data for constructing a plurality of different disassembly diagrams in the step of disassembling the items to be recycled, a step management database 42, which stores step management data including external images of the items to be recycled in correspondence with item disassembly data, and a signal line for connecting to the internet 199, are connected to the I/F 38 as outside devices.

Figure 3:
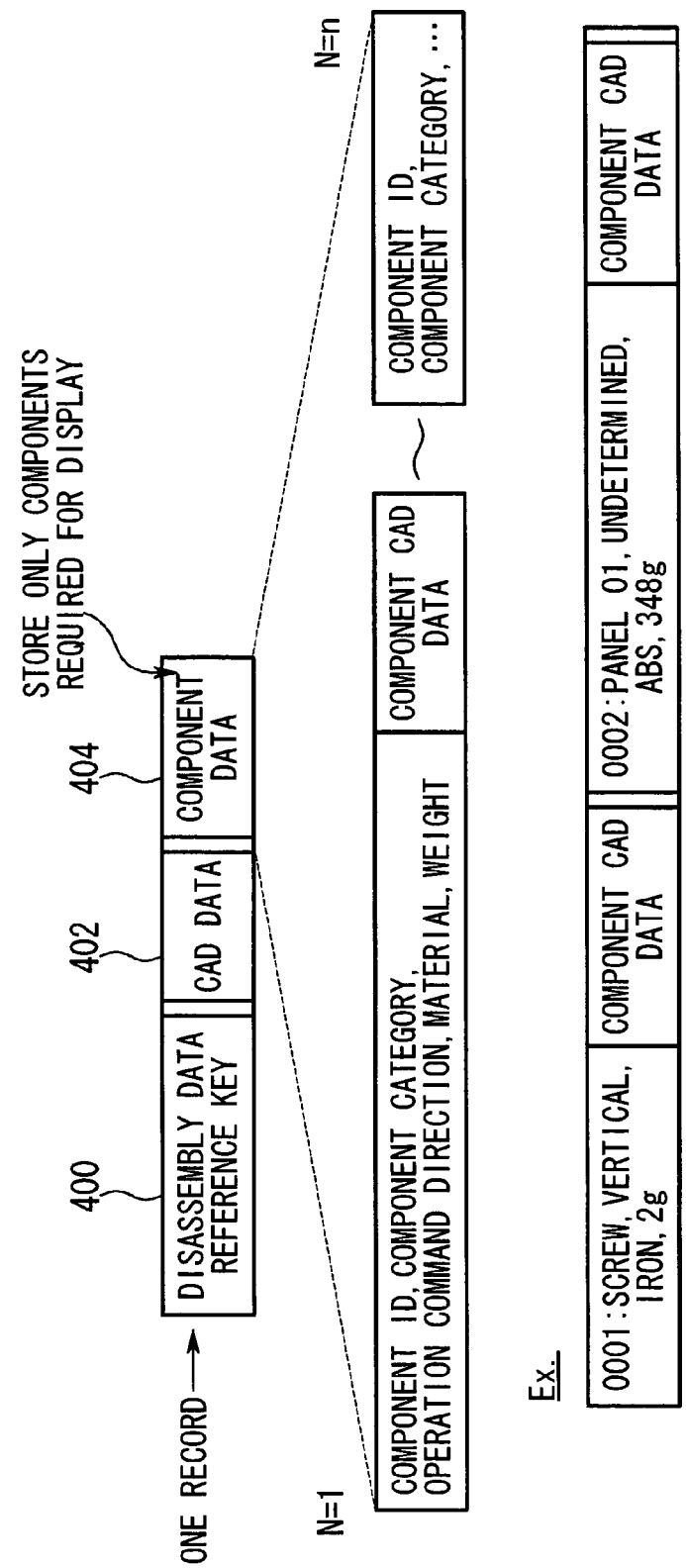
FIG. 3 is a diagram showing the data structure of an item disassembly database 40 shown in FIG. 2 in the first embodiment.

FIG. 3 shows the data structure of the item disassembly database 40 shown in the first embodiment of FIG. 2.

The item disassembly database 40 stores item disassembly data in correspondence with item ID data (e.g. product number and name of machine type) for identifying the item to be recycled. As shown in FIG. 3, the item disassembly database 40 shores one or a plurality of records for each item to be recycled. Each record corresponds to one segment when the disassembly process is segmented, and stores data for constructing a disassembly diagram, which illustrates the operating sequences for shifting to the next segment of the step; more specifically, one record comprises a field 400 that stores a disassembly data reference key, a field 402 that stores CAD data for constructing the disassembly diagram, and a field 404 that stores component data, which relates to components including the item to be recycled.

The component data relates to components that comprise the items to be recycled, which are necessary for displaying the disassembly diagram, and contains a component ID, a component category, an operation command direction, material, weight, and component CAD data, for each component. In the example shown in FIG. 3, a component number of "0001", a component category of "screw", an operation command direction of "vertical", and a material of "iron" are stored as component data for a screw, which is one of the components. The component CAD data comprises three-dimensional coordinate data, and can be used to create a diagram showing the shape seen from a given direction by converting the coordinates.

Figure 4:
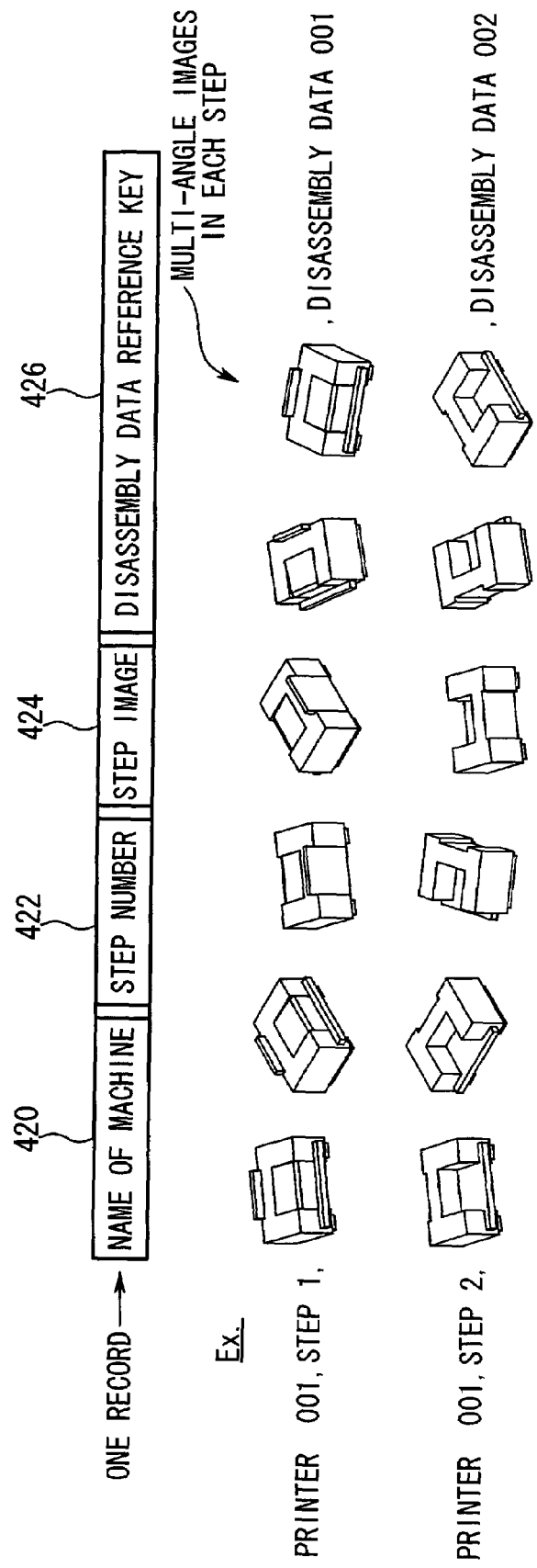
FIG. 4 is a diagram showing the data structure of a step management database 42 shown in FIG. 2 in the first embodiment.

FIG. 4 is a diagram showing the data structure of the step management database 42 shown in FIG. 2 in the first embodiment.

The step management database 42 stores the step management data in correspondence with the item ID data. As shown in FIG. 4, the step management database 42 stores one or a plurality of records for each item ID data. Each record corresponds to one segment when the disassembly process is segmented in the same manner as mentioned above, and stores data for managing the step of that segment including a field 420 for storing the name of machine type, a field 422 for storing a step number of the step, and a field 424 for storing an external image (hereinafter simply "step image") of the item to be recycled, and a field 426 for storing a disassembly data reference key of the item disassembly data for constructing the disassembly diagram preferably that step. In the example shown in FIG. 4, the first record stores "printer001" as the name of machine type, "step 1" as the step number, external images of the item to be recycled viewed from a plurality of angles as the step image, and "disassembly data 001" as the disassembly data reference key. This signifies that, when disassembling an item to be recycled having the machine name of "printer001", the actual external image is compared with the step images to determine whether the disassembly operation is the first step, and, when it has been determined that the disassembly operation is the first step, a disassembly diagram is constructed based on item disassembly data identified by a disassembly data reference key of "disassembly data 001".

Figure 5:
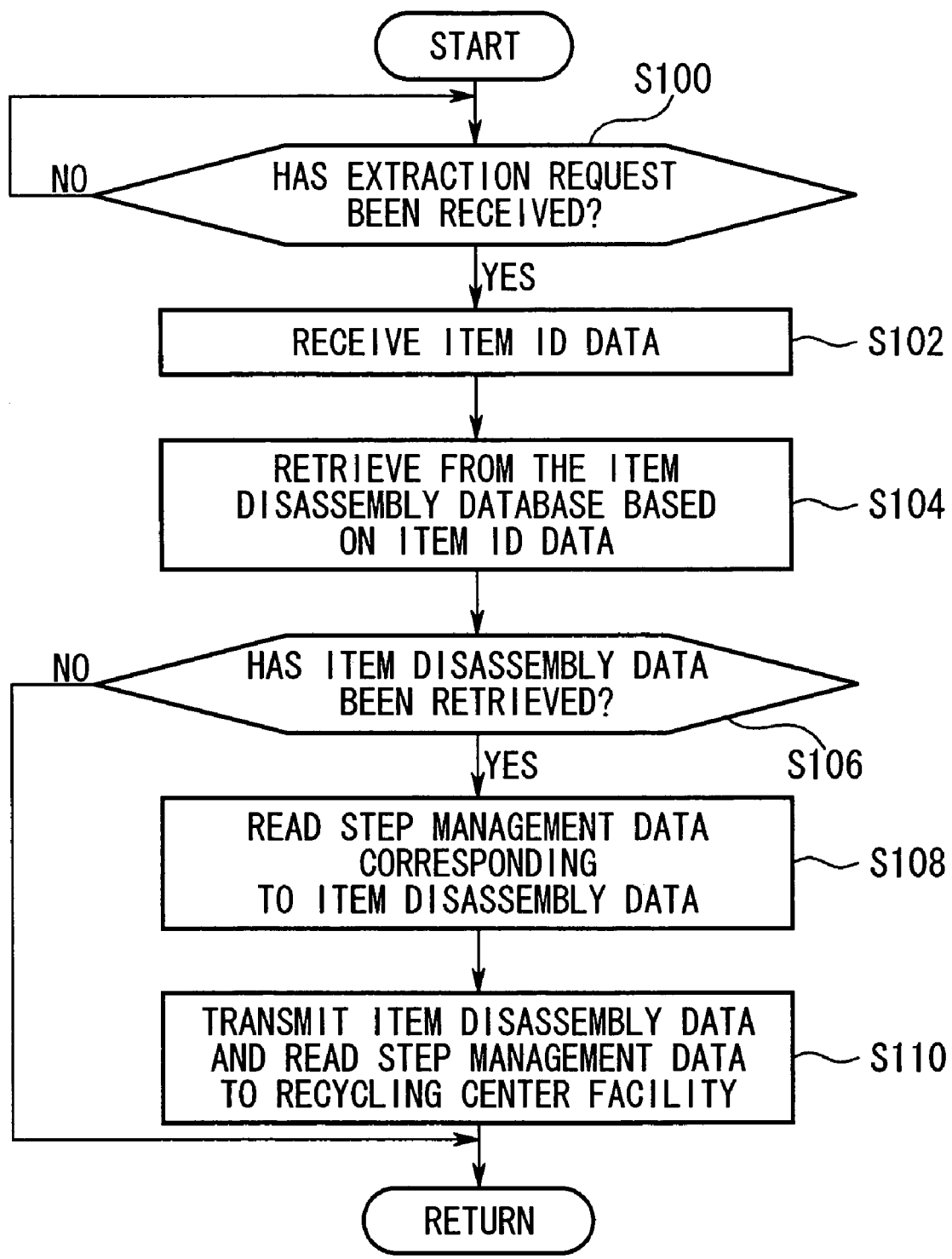
FIG. 5 is a flowchart showing item disassembly data supply processing in the first embodiment.

The CPU 30 comprises a microprocessing unit MPU or the like, and activates a predetermined program stored in a predetermined region of the ROM 32; in compliance with this program, the CPU 30 executes an item disassembly data supply process shown in FIG. 5.

FIG. 5 is a flowchart showing the item disassembly data supply process.

The item disassembly data supply process is a process of supplying the item disassembly data and the step management data to the recycling center facility 200 in accordance with an extraction request therefrom; when executed by the CPU 30, processing shifts to step S100 as shown in FIG. 5.

In step S100, the CPU 30 determines whether an extraction request for item disassembly data and step management data has been received; when it is determined that such an extraction request has been received (Yes), the process shifts to step S102, and when it is determined that such an extraction request has not been received (No), the CPU 30 stands by in step S100 until it is received.

The item ID data is received in step S102, and the CPU 30 proceeds to step S104 where, based on the received item ID data, all the item disassembly data corresponding to the item ID data are retrieved from the item disassembly database 40, before proceeding to step S106.

In step S106, the CPU 30 determines whether the item disassembly data has been retrieved; when it is determined that the item disassembly data has been received (Yes), the process shifts to step S108, and reads all of the step management data corresponding to the retrieved item disassembly data from the step management database 42, and shifts to step S110.

In step S110, the retrieved item disassembly data and read step management data are transmitted to the recycling center facility 200, ending this series of processes and returning to the original processing.

On the other hand, when it is determined in step S106 that the not one of the item disassembly data has been received (No), this processing series ends and the CPU 30 returns to the original processing.

Subsequently, the constitution of the recycling center facility 200 will be explained in detail with reference to FIG. 6.

Figure 6:
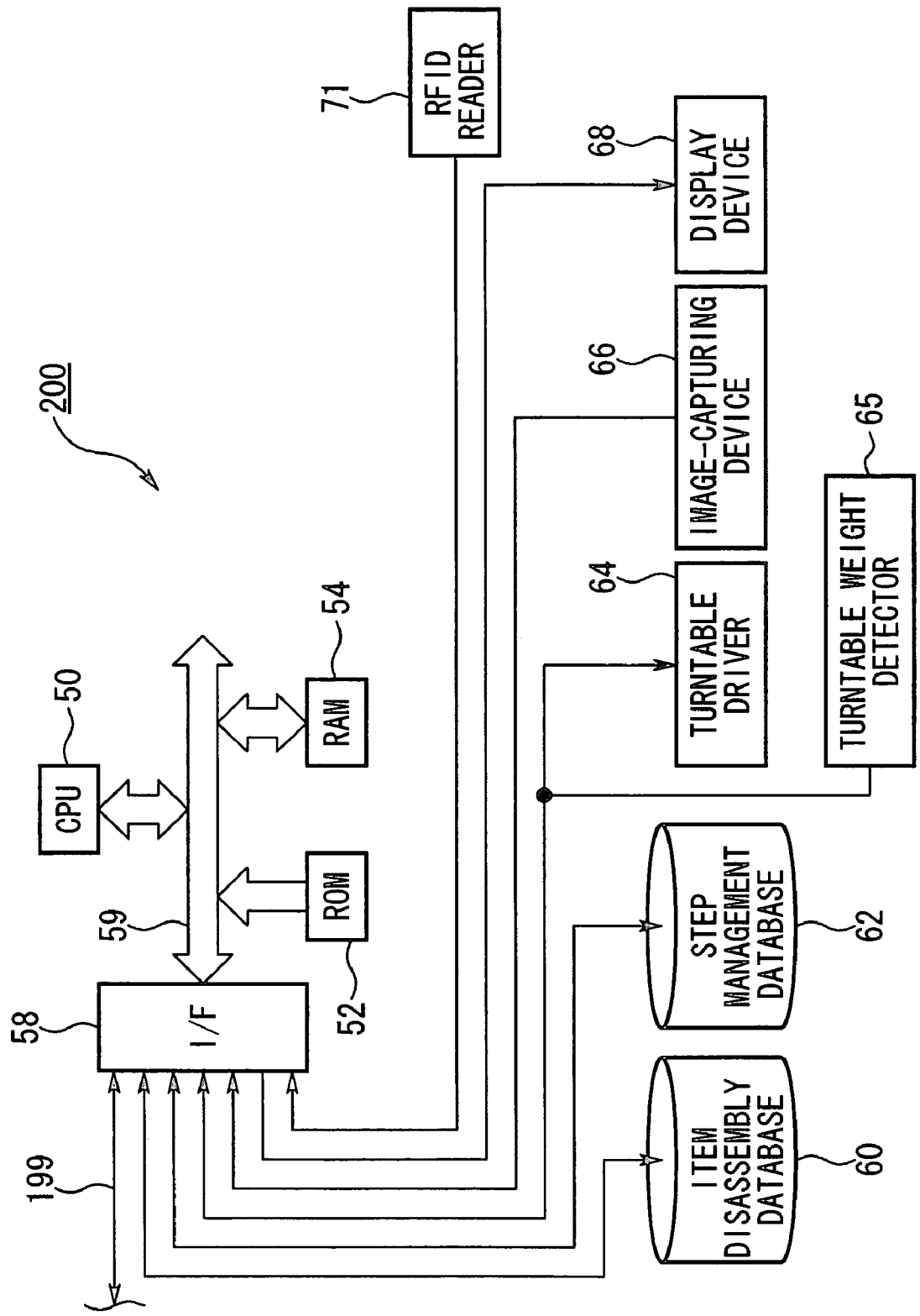
FIG. 6 is a block diagram showing the constitution of a recycling center facility 200 in the first embodiment.

FIG. 6 is a block diagram showing the constitution of the recycling center facility 200.

As shown in FIG. 6, the recycling center facility 200 comprises a CPU 50, which controls the entire system and computations based on a control program, a ROM 52, which stores control programs and the like of the CPU 50 beforehand in a predetermined region, a RAM 54 for storing data read from the ROM 52 and computation results, which are required in the computation processes of the CPU 50, and an I/F 58 that acts as a medium for inputting and outputting data to and from outside devices; these are connected to each other so as to be able to receive data by a bus 59, which is a signal line for transferring the data.

An item disassembly database 60, which stores item disassembly data, a step management database 62, which stores step management data, a turntable driver 64, which drives an unillustrated turntable used as an operation table for mounting the item to be recycled, a turntable weight detector 65 for detecting the weight of the item mounted on the turntable, an image-capturing device 66 for capturing an external image of the item to be recycled that is mounted on the turntable, a display device 68 for displaying a screen based on an image signal, a radio frequency identification system (RFID) reader 71 for reading RFID tags, which are attached to each component including the item to be recycled, and a signal line for connecting to the internet 199, are connected to the I/F 58 as outside devices. The item disassembly database 60 has the same data structure as the item disassembly database 40, and the step management database 62 has the same data structure as the step management database 42.

Figure 7:
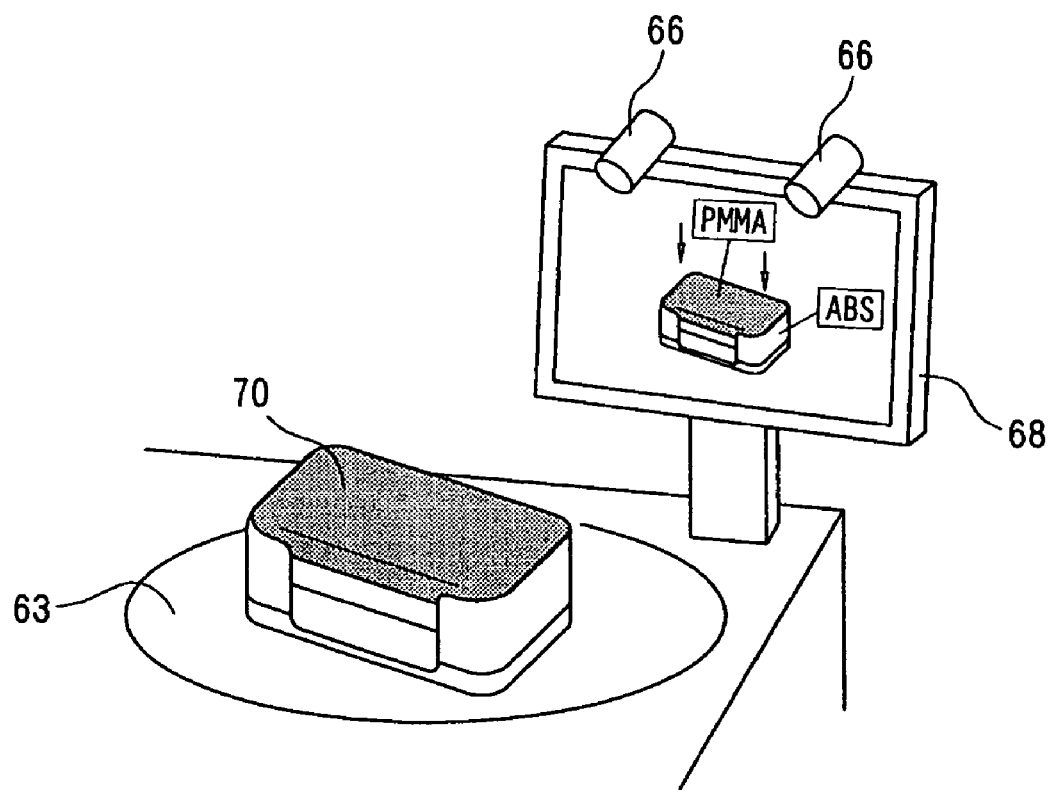
FIG. 7 is a diagram showing the arrangement constitution of an image-capturing device 66 and a display device 68 in the first embodiment.

FIG. 7 is a diagram showing the arrangement constitution of the image-capturing device 66 and the display device 68.

In FIG. 7, an item to be recycled 70 is mounted on a turntable 63. Beside the turntable 63 is provided the display device 68, which the disassembly operator views as he performs the disassembly operation. The image-capturing device 66 is attached above the display device 68, enabling it to capture an external image of the item to be recycled 70, mounted on the turntable 63.

Figure 8:
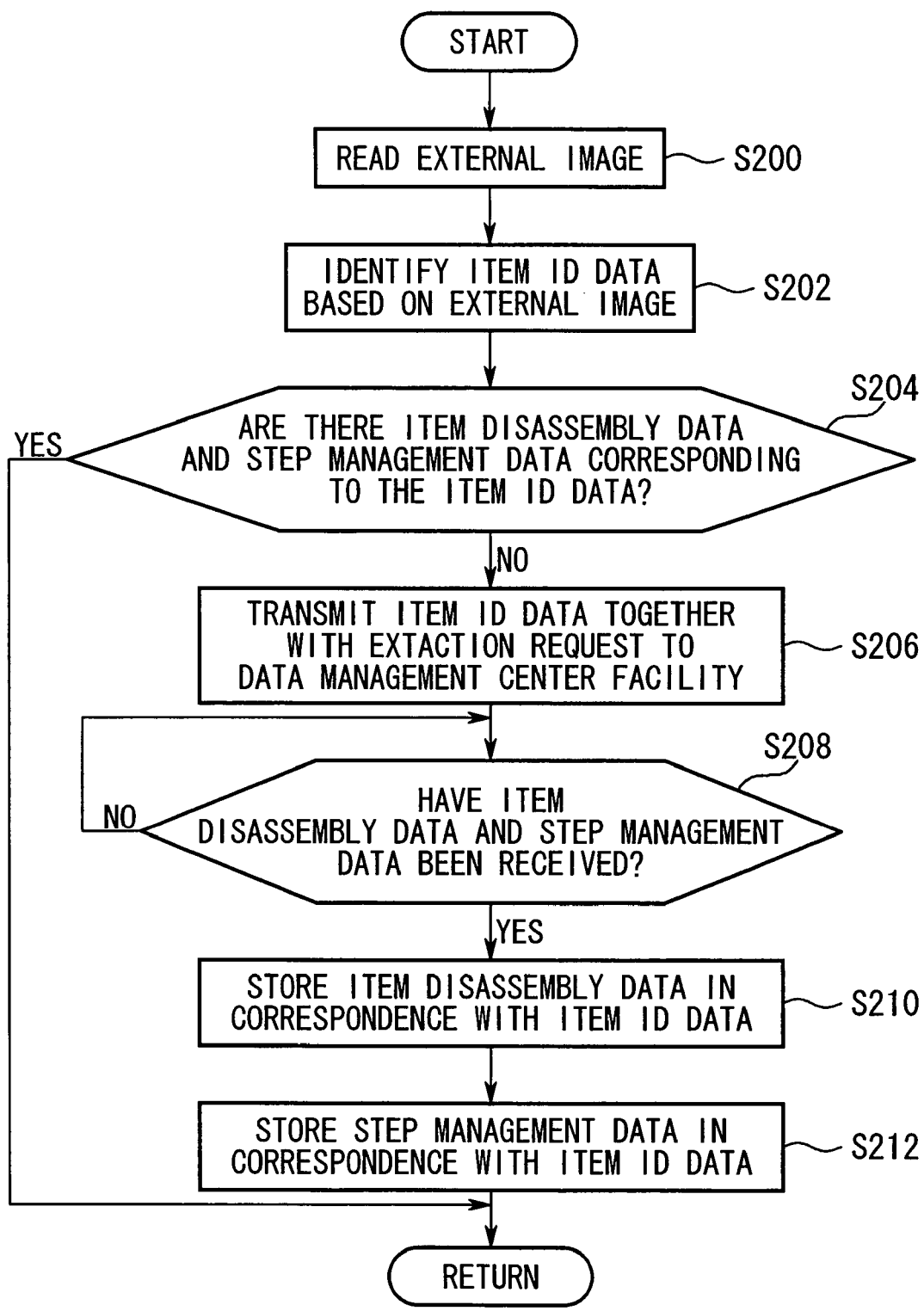
FIG. 8 is a flowchart showing an item disassembly data extraction process in the first embodiment.
Figure 9:
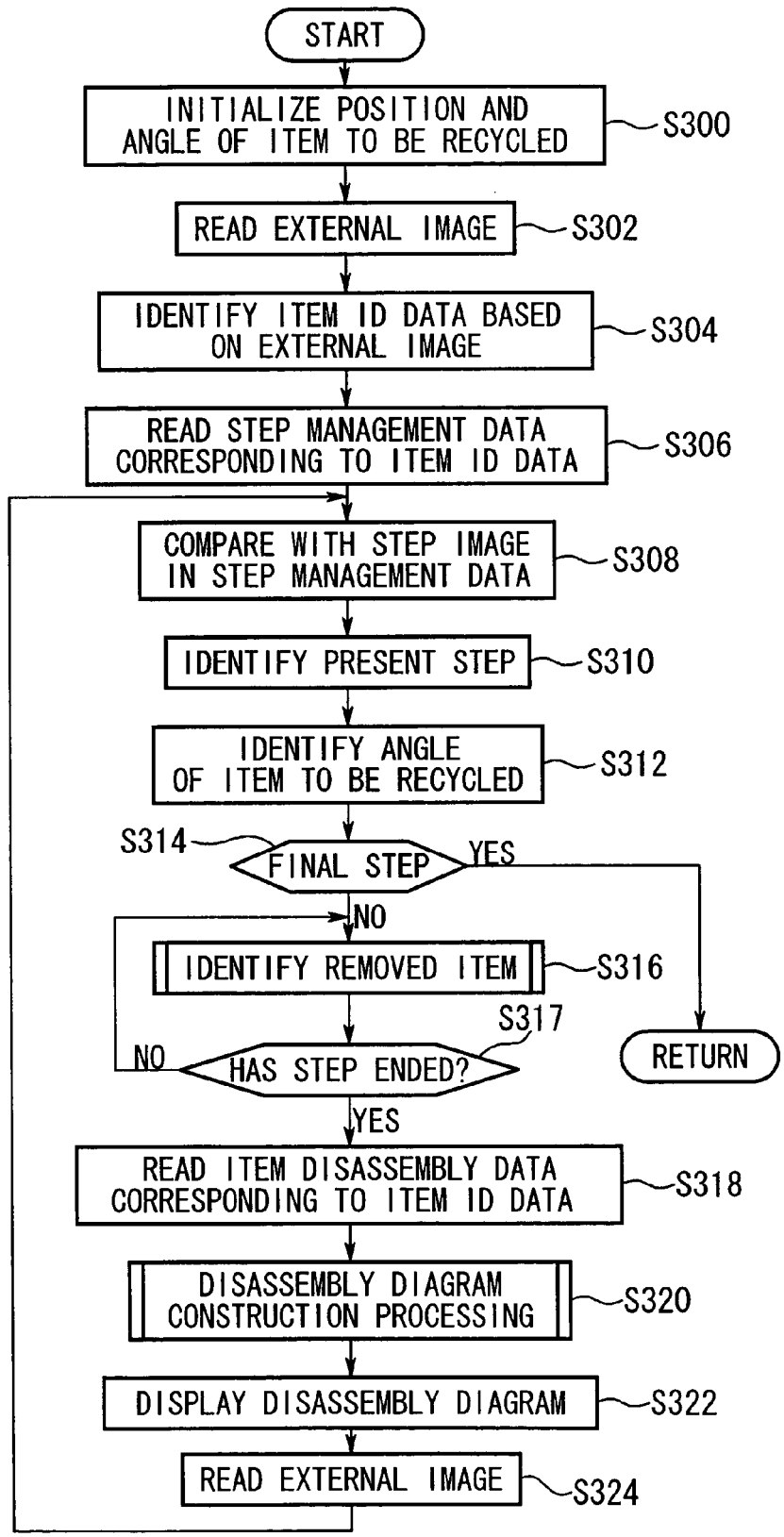
FIG. 9 is a flowchart showing a disassembly diagram display process in the first embodiment.

The CPU 50 comprises a microprocessing unit MPU or the like, and activates predetermined programs stored in predetermined regions of the ROM 52; in compliance with the programs, the CPU 50 executes an item disassembly data extraction process and a disassembly diagram display process, shown in the flowcharts of FIGS. 8 and 9, in a time-sharing manner.

At first, the item disassembly data extraction process will be explained with reference to FIG. 8.

FIG. 8 is a flowchart showing an item disassembly data extraction process in the first embodiment.

The item disassembly data extraction process is a process for extracting item disassembly data and step management data from the data management center facility 100 in correspondence with the item disassembly data supply process shown in FIG. 5; when executed by the CPU 50, the process first shifts to step S200 as shown in FIG. 8.

In step S200, the image-capturing device 66 captures an external image of the item to be recycled 70, which is mounted on the turntable 63; then, proceeding to step S202, the item ID data of the item to be recycled 70 is identified based on the captured external image, and processing proceeds to step S204.

In step S204, the CPU 50 determines whether the item disassembly data and step management data corresponding to the item disassembly data, which was identified, are stored in the item disassembly database 60 and the step management database 62; when it determines that the item disassembly data and step management data corresponding to the item disassembly data, which was identified, are not in the databases (No), the CPU 50 shifts to step S206, where it transmits the identified item disassembly data with an extraction request to the data management center facility 100, and then shifts to step S208.

In step S208, the CPU 50 determines whether the item disassembly data and the step management data have been received; when it determines that they have been received (Yes), it proceeds to step S210, otherwise (No), it stands by in step S208 until the item disassembly data and the step management data are received.

In step S210, the received item disassembly data is stored in the item disassembly database 60 in correspondence with the item ID data, and, shifting to step S212, the received step management data is stored in the step management database 62 in correspondence with the item disassembly data, whereby one series of processes ends and the CPU 50 returns to its original processing.

On the other hand, when it is determined in step S204 that the item disassembly data and step management data corresponding to the identified item disassembly data are already stored in the item disassembly database 60 and the step management database 62 (Yes), one series of processes ends and the CPU 50 returns to its original processing.

Subsequently, disassembly diagram display processing will be explained in detail with reference to FIG. 9.

FIG. 9 is a flowchart showing the disassembly diagram display process.

Disassembly diagram display processing is executed at the start of the disassembly operation, and involves displaying a disassembly diagram on the display device 68 in accordance with the progress of the disassembly operation of the item to be recycled 70; as shown in FIG. 9, when the CPU 50 executes the disassembly diagram display process, it shifts to step S300.

In step S300, the CPU 50 drives the turntable driver 64, initializes the position and angle of the item to be recycled 70 mounted on the turntable 63, then shifts to step S302, in which the image-capturing device 66 captures an external image of the item to be recycled 70 mounted on the turntable 63, and then, in step S304, the item disassembly data of the item to be recycled 70 is identified based on the captured external image, and the process proceeds to step S306.

In step S306, all the step management data corresponding to the identified item disassembly data is read out from the step management database 62, and, shifting to step S308, the captured external image is compared with the step images included in the step management data which was read; step images which are identical or similar to the captured external image are identified there, and the process shifts to step S310. Here, "step" denotes operations such as "remove control panel" and the like. In order to execute this step, a plurality of components must be removed by operations such as "remove four screws", "remove control panel protective member" and "remove control panel".

In step S310, the present step is identified from the identified step images, and, in step S312, the angle of the item to be recycled 70 mounted on the turntable 63 is identified from the external images captured in steps S302 and S304, and the processing proceeds to step S314.

In step S314, it is determined whether the present step is the final step; when the present step is not the final step (No), proceeding to step S316, the removed component is identified and, in step S317, it is determined whether the present step has ended (whether the component removal operations of the present step have all ended), and step S316 is repeated until the present step ends. When it is determined that the present step has ended, processing proceeds to step S318.

In step S318, the identified item disassembly data and the item disassembly data corresponding to the present step are read from the item disassembly database 60, and, shifting to step S320, the disassembly diagram construction process for construct a disassembly diagram is executed based on the item disassembly data that was read; then, in step S322, the constructed disassembly diagram is displayed on the display device 68, and, shifting to step S324, the image-capturing device 66 captures an external image of the item to be recycled 70 mounted on the turntable 63, and processing shifts to step S308.

On the other hand, in step S314, when it is determined that the present step is the final step (Yes), one series of processes ends and the CPU 50 returns to its original processing.

Figure 13:
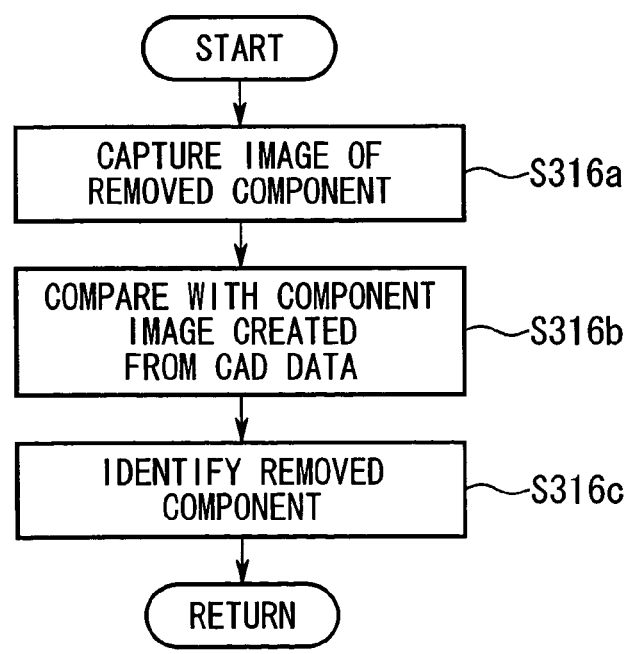
FIG. 13 is a flowchart showing a process of identifying a removed component in the first embodiment.

Subsequently, the identification process of the removed component, executed in step 316, will be explained in detail with reference to FIGS. 13, 14, and 15. At first, referring to FIG. 13, a process of identifying the removed component by image recognition will be explained. FIG. 13 is a flowchart showing a process of identifying a removed component. At first, in step S316a, the image-capturing device 66 captures an image of the removed component. At this time, the disassembly operator can easily capture a close-up image of the removed component by placing it in front of the lens of the image-capturing device 66. Next, in step S316b, a component image created from component CAD data is compared with the image captured in step S316a. The component CAD data used in this comparison relates only to candidate components, which are likely to be removed in the present step. Subsequently, in step S316c, the removed component is identified based on the result of the comparison. This process of identifying the component is performed by selecting the candidate component having the highest matching CAD data.

Subsequently, referring to FIG. 14, a process of identifying the removed component, performed by a weight detector, will be explained. FIG. 14 is a flowchart showing a process of identifying a removed component, performed by a weight detector. At first, in step S316d, weight change in the turntable is detected by reading the output from the turntable weight detector 65. Only a reduction in weight caused by the removal of a component is detected. Since weight reduction in this case is caused only by removing a component, by making such weight reduction the only target of the detection, it is possible to prevent the processing from becoming complex, and prevent mistakes in detection arising when the disassembly operator has increased the weight at the moment of removing the component, and the like. Next, in step S316e, the weight of the components contained in the component data 404 is compared with the weight reduction detected in step S316d. The component weight used in this comparison is the weight only of candidate components, which may possibly be removed during the present step. Subsequently, in step S316f, the removed component is identified based on the result of the comparison. This process of identifying the component is performed by selecting the candidate component having the best matching component weight.

Subsequently, a process of identifying a removed component by using RFID will be explained with reference to FIG. 15. FIG. 15 is a flowchart showing a process of identifying a removed component, performed using RFID. At first, in step S316g, an RFID reader 71 reads the content of an RFID tag that is appended to the removed component, and thereby obtains the component ID. At this time, the disassembly operator can easily read the component ID of the removed component by placing it in front of the RFID reader 71. Then, in step S316h, the removed component is identified based on the component ID that has been read.

Figure 14:
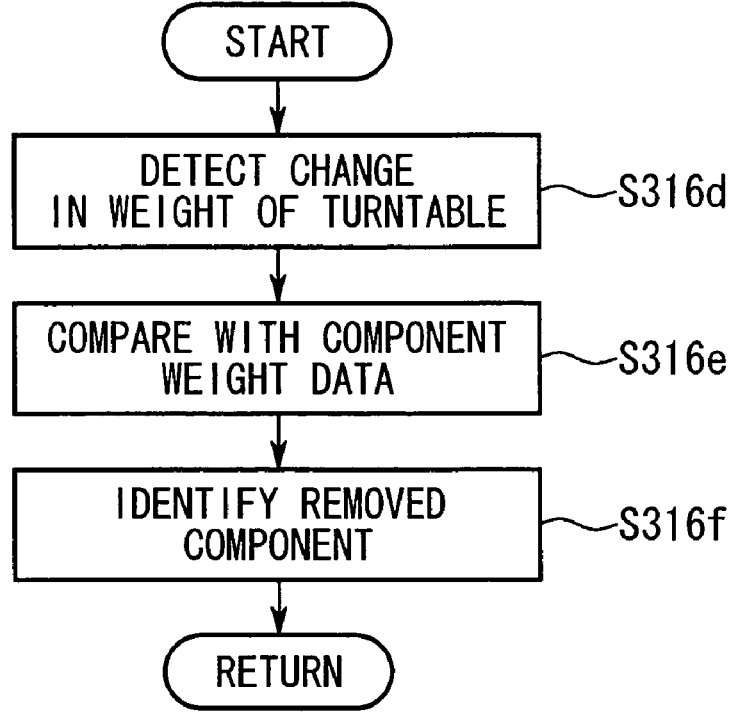
FIG. 14 is a flowchart showing a process of identifying a removed component in the first embodiment.
Figure 15:
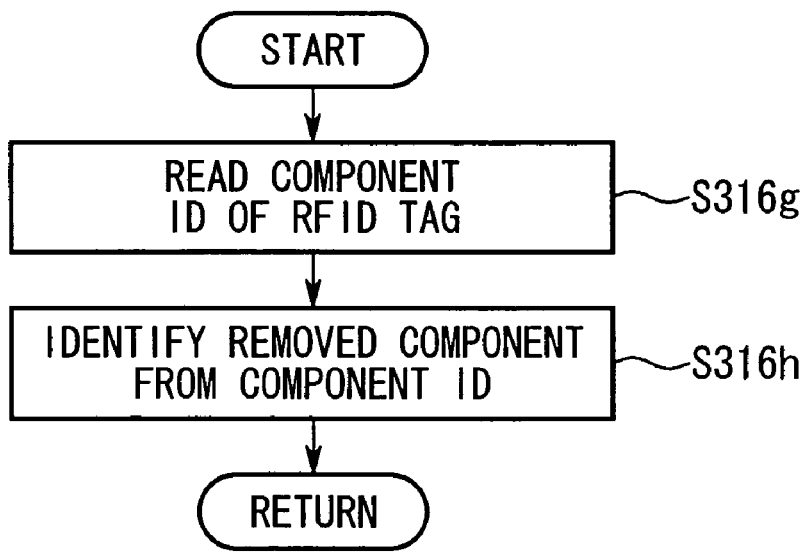
FIG. 15 is a flowchart showing a process of identifying a removed component in the first embodiment.

Incidentally, the precision of the identification processes of the removed component shown in FIGS. 13 to 15 may be improved by combining them. For instance, by combining the image recognition and weight change processes, a component that is difficult to identify by its image can be identified by change in its weight, and a component that is difficult to identify by change in its weight can be identified by its image, enabling the steps of identification to be executed more accurately. Furthermore, large components can easily be identified by appending RFID, and components such as screws, which RFID is difficult to append to, can be identified by image recognition and weight change, enabling the steps of identification to be executed more accurately.

Subsequently, the disassembly diagram construction process in step S320 will be explained in detail with reference to FIG. 10.

Figure 10:
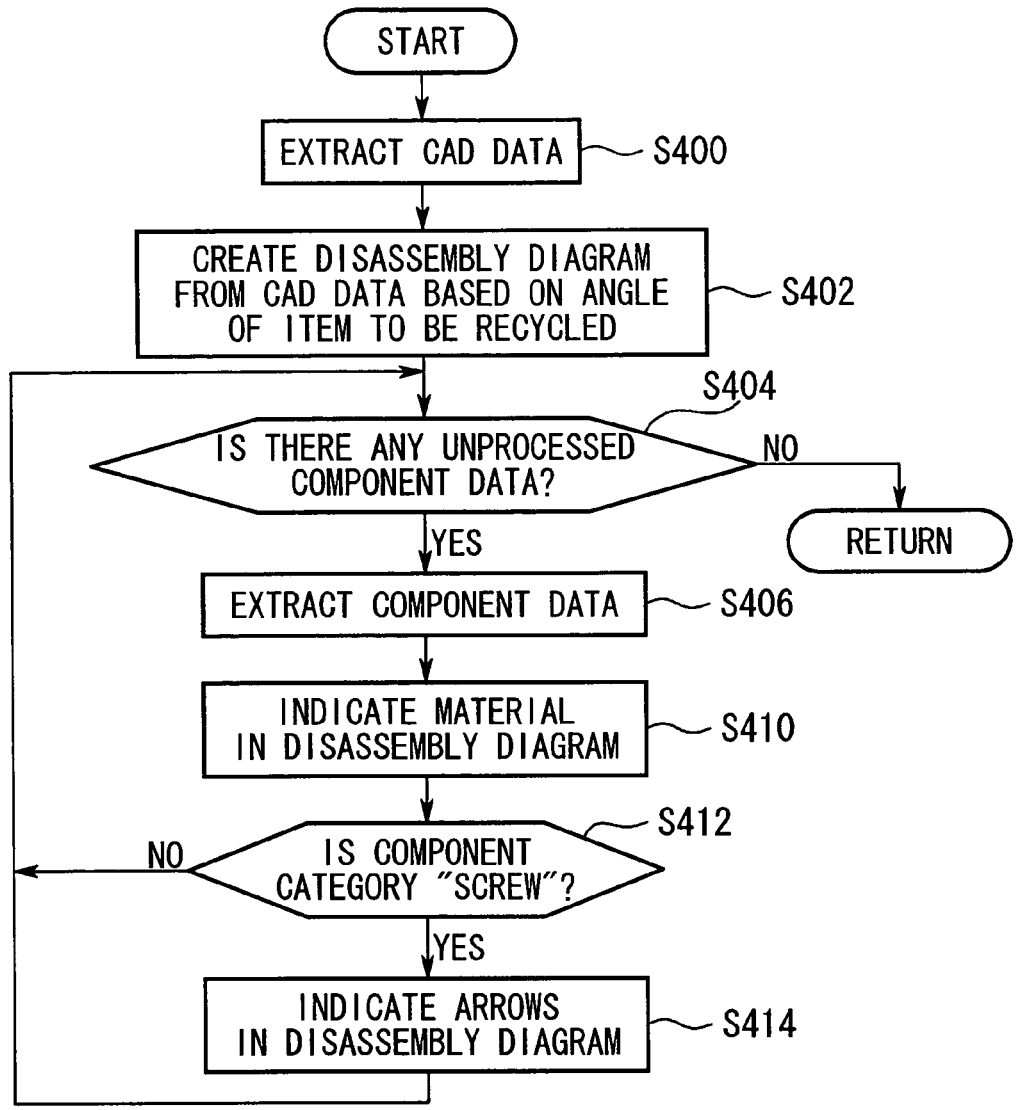
FIG. 10 is a flowchart showing a disassembly diagram constitution process in the first embodiment.

FIG. 10 is a flowchart of the disassembly diagram construction process.

As shown in FIG. 10, to execute the disassembly diagram construction process, in step S320 described above, the processing at first shifts to step S400.

In step S400, the CAD data is extracted from the item disassembly data that was read in step S318 and, shifting to step S402, based on the angle of the item to be recycled 70 identified in step S312, a disassembly diagram including a front view seen from the disassembly operator is created from the CAD data, and the processing shifts to step S404.

In step S404, it is determined whether the item disassembly data, which has been read, contains any unprocessed component data, and if so (Yes), processing shifts to step S406, where the unprocessed component data is extracted from the item disassembly data, and then, in step S410, based on the extracted component data, the material of the component in the disassembly diagram (the component relating to the component data that was read) is indicated in the disassembly diagram, and processing proceeds to step S412.

In step S412, it is determined whether the component category is "screw"; when the component category is determined to be "screw" (Yes), processing proceeds to step S414, where an arrow is indicated in the disassembly diagram in accordance with the operator command direction, and the process shifts to step S404.

On the other hand, when it is determined in step S412 that the component category is not "screw" (No), the processing shifts to step S404.

On the other hand, when it is determined in step S404 that there is no unprocessed component data in the item disassembly data that has been read (No), this series of processes ends and the CPU 50 returns to its original processing.

Subsequently, the operation of the present embodiment will be explained.

At the recycling center 20, prior to disassembling the item to be recycled 70, the disassembly operator mounts the item to be recycled 70 on the turntable 63 in order to obtain item disassembly data, and captures an external image of the item to be recycled 70 by using the image-capturing device 66.

At the recycling center facility 200, when the external image of the item to be recycled 70 is captured, the item ID data of the item to be recycled 70 is identified based on the captured external image by following the steps S202 to S206, and the identified item ID data is transmitted to the data management center facility 100 together with an extraction request.

When the item ID data and the extraction request are received at the data management center facility 100, by executing step S104, all the item disassembly data corresponding to the item ID data are retrieved from the item disassembly database 40 based on the received item ID data. As a result, when the item disassembly data is retrieved, steps S108 and S110 are performed to read all the step management data corresponding to the retrieved item disassembly data from the step management database 42, and the retrieved item disassembly data and the read step management data are transmitted to the recycling center facility 200.

When the recycling center facility 200 receives the item disassembly data and the step management data, steps S210 and S212 are performed so as to store the received item disassembly data in correspondence with the item ID data in the item disassembly database 60, and the received step management data is similarly stored in correspondence with the item ID data in the step management database 62. Consequently, the disassembly operator at the recycling center facility 200 is able to obtain the necessary item disassembly data and step management data.

Subsequently, at the recycling center 20, the disassembly operator uses the image-capturing device 66 to capture an external image of the item to be recycled 70 mounted on the turntable 63.

At the recycling center facility 200, when the external image of the item to be recycled 70 is captured, the steps S304 and S306 are carried out to identify the item ID data of the item to be recycled 70 based on the captured external image, and all the step management data corresponding to the identified item ID data are read from the step management database 62. Next, in step S308, the external image that has been captured is compared with the step images contained in the step management data that was read, and the image data, which is identical or similar to the captured external image, is identified therefrom.

Subsequently, steps S310 and S312 are executed to identify the present step from the identified step images, and, based on the captured external image, the angle of the item to be recycled 70, which is mounted on the turntable 63, is determined. At this time, when the present step is not the final step, the removed component is identified to determine that the present step has ended; then, by carrying out steps S318 and S320, the identified item ID data and the item disassembly data corresponding to the present step are read from the item disassembly database 60, and the disassembly diagram is constructed based on the item disassembly data that has been read. More specifically, by performing steps S400 and S402, CAD data is extracted from the item disassembly data, and, based on the angle of the item to be recycled 70, the disassembly diagram is created from the CAD data as a front view seen from the disassembly operator. Then, in steps S406 and S410, the component data is extracted from the item disassembly data, and, based on the extracted component data, the material of the component in the disassembly diagram is indicated in the disassembly diagram. Moreover, when the component category of the component is "screw", via step S414, an arrow is indicated in the disassembly diagram in accordance with the operation command direction. The processes of steps S406 to S414 are then carried out for all the component data contained in the item disassembly data.

Figure 11:
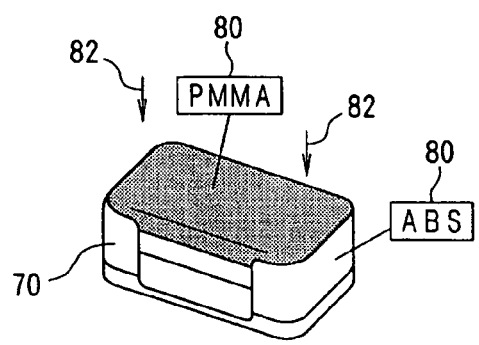
FIG. 11 is a diagram showing one example of a disassembly diagram in the first embodiment.

FIG. 11 is a diagram showing one example of a disassembly diagram. In the example of FIG. 11, a material numeral 80 is appended to the component including the item to be recycled 70, and arrows 82 indicating the operation command direction are appended to the screw, which comprises the item to be recycled 70. Incidentally, reference code "PMMA" of the material numeral 80 represents acryl, and "ABS" represents ABS resin.

At the recycling center facility 200, when the disassembly diagram is constructed, steps S322 and S324 are carried out to display the constructed disassembly diagram on the display device 68, capturing the external image of the item to be recycled 70. Then, the processes of steps S308 to S324 are repeated until the final step of the disassembly operation.

In this way, in the present embodiment, the data management center facility 100 has the item disassembly database 40, which stores the item disassembly data in correspondence with the item ID data, and, when an item ID data is received, the item disassembly data is retrieved from the item disassembly database 40 based on the received item ID data, and the retrieved item disassembly data is transmitted to the recycling center facility 200; the recycling center facility 200 reads the item ID data from the item to be recycled 70, and transmits the item ID data that it has read to the data management center facility 100; when the item disassembly data has been received, one of a plurality of possible disassembly diagrams is constructed from the received item disassembly data, in accordance with the progress of the disassembly operation of the item to be recycled 70, and the constructed disassembly diagram is displayed on the display device 68.

This enables the disassembly operator to ascertain the specific disassembly procedures for disassembling the item to be recycled 70 from the disassembly diagram, and, in addition, does not require any considerable time or effort, enabling him to determine the appropriate procedures in accordance with the progress of the disassembly operation, and achieving a more effective disassembly operation than by conventional methods.

Further, in the present embodiment, the recycling center facility 200 has the image-capturing device 66 for capturing an external image of the item to be recycled 70, enabling the progress of the disassembly operation to be determined based on the external image captured by the image-capturing device 66, and, in accordance with the determined progress, one of a plurality of possible disassembly diagrams is constructed from the received item disassembly data.

Consequently, since the progress of the disassembly operation is determined from the external image of the item to be recycled 70, the disassembly operator can ascertain the appropriate sequence in accordance with the progress of the disassembly operation. Furthermore, the disassembly operator does not need to make a special command for relating to the progress of the disassembly operation during the operation. Therefore, the disassembly operation can be performed more efficiently.

Moreover, in the present embodiment, the data management center facility 100 has the step management database 42 which stores step management data, and, by reading the step management data corresponding to the retrieved item disassembly data from the step management database 42, and transmitting the retrieved item disassembly data and the read step management data to the recycling center facility 200, the recycling center facility 200 can compare the external image, captured by the image-capturing device 66, with the step images contained in the received step management data, and identify an identical or similar external image from among them, and can then construct a disassembly diagram from among a plurality of possible disassembly diagrams based on the received item disassembly data, such that the disassembly diagram corresponds to the identified external image.

Consequently, since the disassembly diagram corresponds to the external image of the item to be recycled 70, the disassembly operator can ascertain the appropriate sequence in accordance with the progress of the disassembly operation. Therefore, the disassembly operation can be performed even more efficiently.

Moreover, in the present embodiment, the recycling center facility 200 constructs the disassembly diagram so as to be a front view of the item to be recycled 70 seen from the disassembly operator.

Since the disassembly diagram is a front view seen from the disassembly operator, he can easily ascertain the specific procedures for disassembling the item to be recycled 70. Therefore, the disassembly operation can be performed even more efficiently.

Moreover, in the present embodiment, the disassembly diagram contains the material numeral 80 for classifying the material of the component that comprises the item to be recycled 70.

Consequently, the disassembly operator can classify the component including the item to be recycled 70 by referring to the material numeral 80 that is displayed, making the classification operation simple. Therefore, the classification operation can be performed more efficiently than when following conventional methods.

Moreover, in the present embodiment, the disassembly diagram includes the arrows 82, which indicate the position of a screw for securing the component that comprises the item to be recycled 70.

This enables the disassembly operator to ascertain the position of the screw for securing the component that comprises the item to be recycled 70 by referring to the displayed arrows 82, facilitating the disassembly operation. Therefore, the disassembly operation can be performed even more efficiently.

Figure 12:
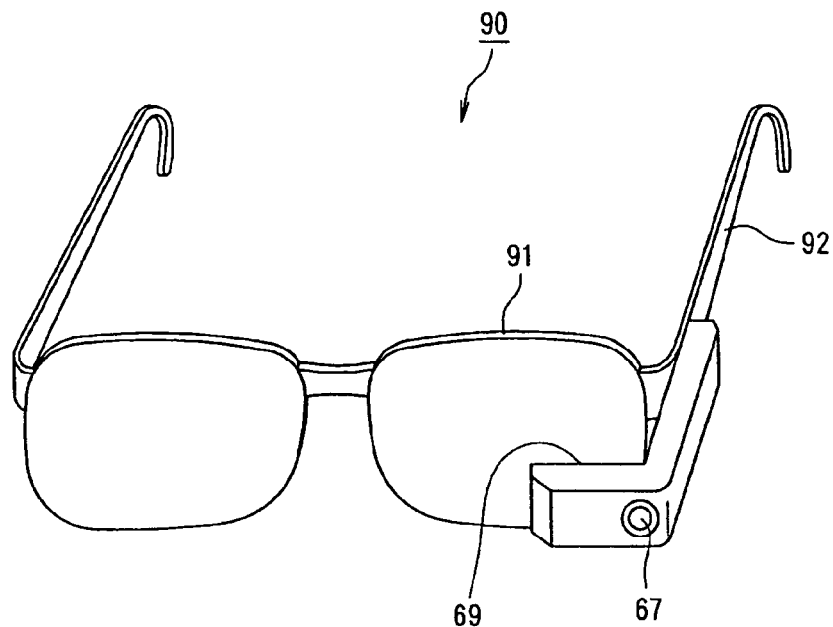
FIG. 12 is a diagram showing the constitution when a display device and an image-capturing device are provided to glasses 90 worn by the disassembly operator in the first embodiment.

In the embodiment described above, the display device 68 is fitted to the turntable 63 and the image-capturing device 66 is fitted to the display device 68, but the constitution is not restricted to this arrangement; instead, as shown in FIG. 12, the display device and the image-capturing device may be fitted to glasses 90, which are worn by the disassembly operator.

FIG. 12 shows the constitution when the display device and the image-capturing device are fitted to glasses 90, worn by the disassembly operator.

As shown in FIG. 12, a display device 69 comprises a liquid crystal display (LCD), and is fitted to one of the lenses 91 of the glasses 90 so that, when wearing the glasses 90, the disassembly operator can see the disassembly diagram displayed on a display device 69; in addition, an image-capturing device 67 is fitted to a frame 92 of the glasses 90 so as to enable the disassembly operator to capture an external image of the item to be recycled 70 while he is wearing the glasses 90 and looking at the item to be recycled 70.

According to this constitution, at the recycling center facility 200, since the display device 69 is fitted to one lens 91 of the glasses 90, when the disassembly operator wears the glasses 90 he can see the disassembly diagram displayed on the display device 69. Furthermore, since the image-capturing device 67 is fitted to the frame 92 of the glasses 90, when the disassembly operator looks at the item to be recycled 70 while wearing the glasses 90, he can use the image-capturing device 67 to capture the external image of the item to be recycled 70.

As a consequence, the disassembly operator can perform the disassembly operation while looking at the disassembly diagram through the glasses 90, requiring no extra time or effort to refer to the disassembly diagram. Furthermore, the external image of the item to be recycled 70 can be captured from the view-point of the disassembly operator, enabling him to accurately ascertain the progress of the disassembly operation, and ascertain the appropriate procedures in accordance with the progress of the disassembly operation. Therefore, the disassembly operation can be performed even more efficiently.

Although the present embodiment describes a case where a control program, stored beforehand in the ROM 32, is used to execute the processes of the flowchart shown in FIG. 5, the present invention is not restricted to such a constitution; instead, a program illustrating the processes may be stored on an unillustrated recording medium and read to the RAM 34.

In the embodiment described above, the processes of the flowcharts in FIGS. 8 to 10 are executed by using a program stored beforehand in the ROM 52, but the present invention is not restricted to such a constitution; instead, a program illustrating the processes may be stored on an unillustrated recording medium and read to the RAM 54.

The recording medium may comprise a semiconductor recording medium such as a RAM or a ROM, a magnetic recording medium such as an FD or an HD, an optical recording medium such as a CD, a CDV, an LD, or a DVD, or a magnetic/optical recording medium such as an MO, or any type of recording medium which can be read by a computer, whether the method for reading the recording medium is electronic, magnetic, optical, or whatever.

The above embodiment describes a case where the recycling facilitating system, the recycling center facility, the data management center facility, the program for facility (recycling facilitating program), and the recycling facilitating method according to the present invention, are applied in a network system including the internet 199, but the present invention is not restricted to this application; for instance, it can be applied in a wide variety of intranets which transmit communications by the same method as the internet 199. In addition to networks which transmit by the same method as the Internet 199, the present invention can of course be applied in normal networks.

Furthermore, the above embodiment describes a case where the recycling facilitating system, the recycling center facility, the data management center facility, the program for facility (recycling facilitating program), and the recycling facilitating method according to the present invention are applied in disassembling and classifying items to be recycled, such as OA products and electrical household appliances, at a recycling center 20, as shown in FIG. 1, but the present invention is not restricted to the above application, and can be applied in a variety of other cases without deviating from its main points.

THE SECOND EMBODIMENT

The second embodiment of the present invention will be explained with reference to FIGS. 16 to 18. The explanation of the present embodiment will concentrate mainly on its points of difference with the first embodiment described above, and features which are the same as those in the first embodiment will not be explained further. In order to clarify sections that correspond to those in the first embodiment, these sections are represented by the same reference codes.

Figure 16:
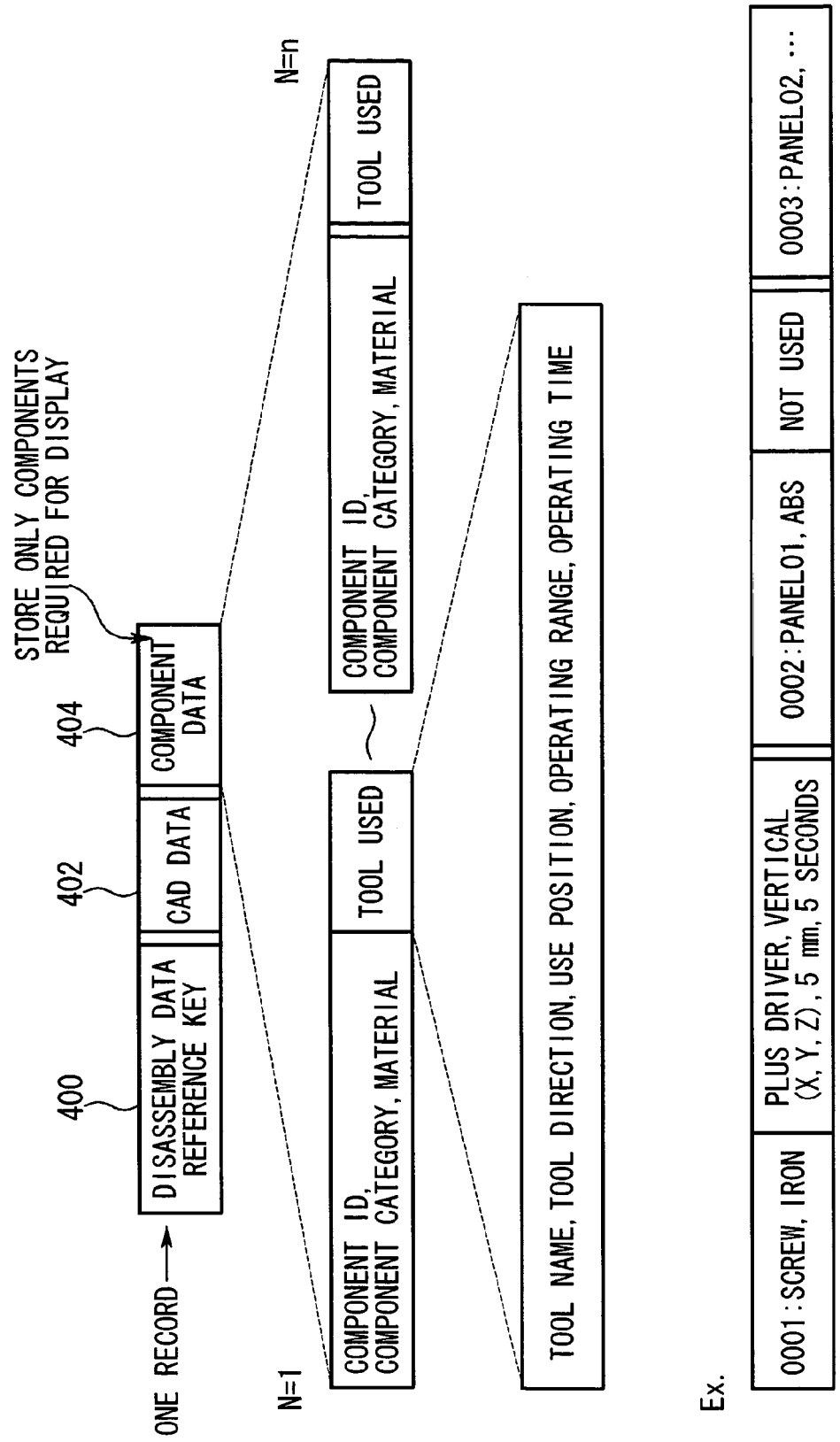
FIG. 16 is a diagram showing a second embodiment of the present invention, and shows another example of a data structure of the item disassembly database 40 shown in FIG. 2.

FIG. 16 shows the data structure of the item disassembly database 40 in the present embodiment, and corresponds to FIG. 3 in the first embodiment described above.

As shown in FIG. 16, the component data in the present embodiment relates to components that comprise the item to be recycled, and is necessary for displaying a disassembly diagram thereof; the component data for each component includes component ID, component category, material, and used tool. "Used Tool" consists of information relating to the tool(s) required to remove the component, and includes tool name, direction of use of tool, operating range when used, and operating time. In the example of FIG. 16, one of the components is a screw, and in its component data has a component ID of "0001", a component category of "screw", a material of "iron", a tool name of "plus driver", a tool direction of "tool direction", coordinates for use position of "(x, y, z)", an operating range of "5 mm", and an operating time of "five seconds". As regards components which do not use tools, their "used tool" entry is "not used".

Subsequently, the constitution of the recycling center facility 200 in the present embodiment will be explained in detail with reference to FIG. 17. FIG. 17 is a block diagram of the constitution of the recycling center facility 200 in the present embodiment, and corresponds to FIG. 6 of the first embodiment described earlier.

Figure 17:
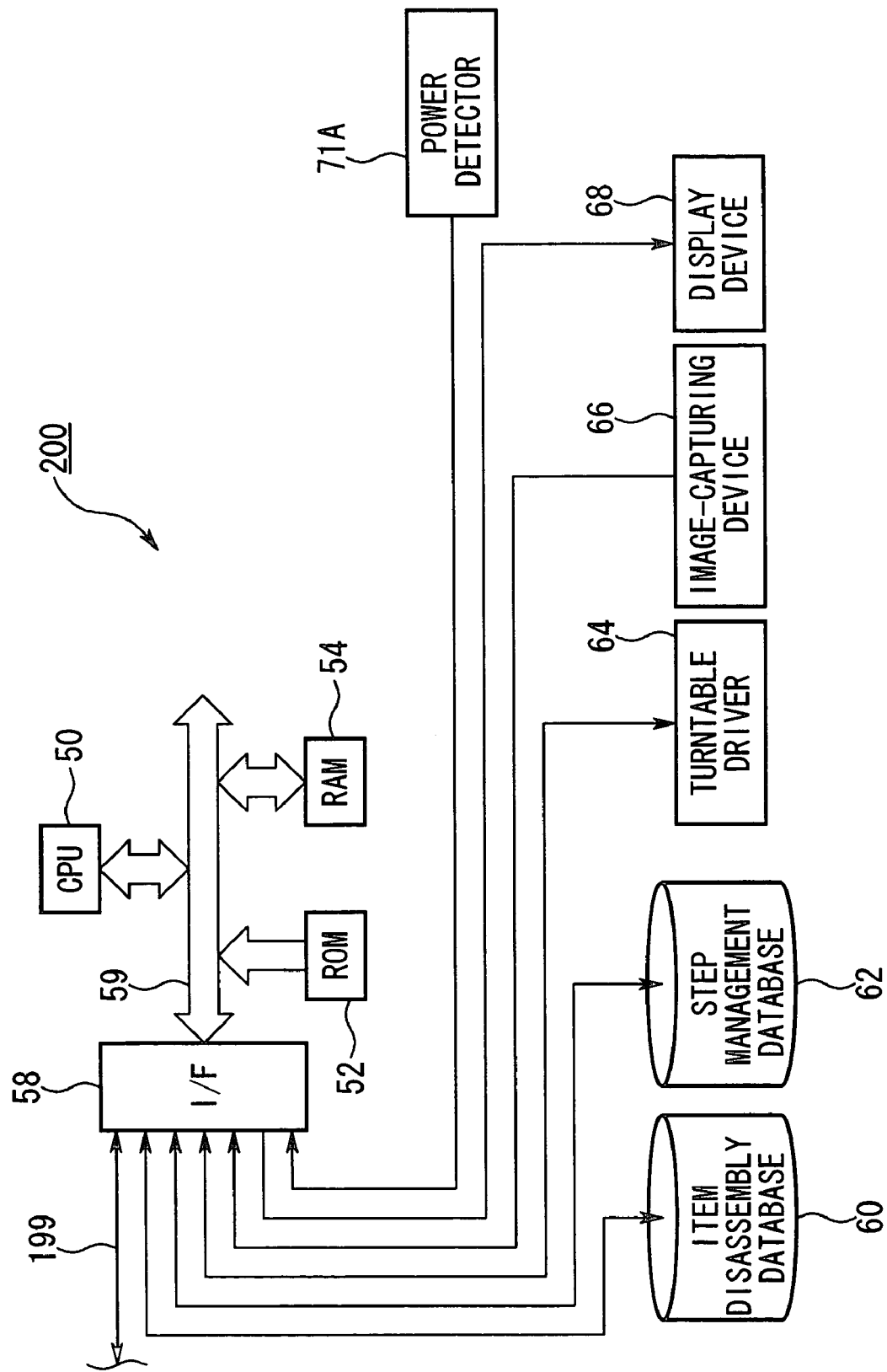
FIG. 17 is a block diagram showing another example of the constitution of the recycling center facility 200 shown in FIG. 2 in the second embodiment.

As shown in FIG. 17, the recycling center facility 200 of the present embodiment comprises a CPU 50, which controls the entire system and computations based on a control program, a ROM 52, which stores control programs and the like of the CPU 50 beforehand in a predetermined region, a RAM 54 for storing data read from the ROM 52 and the like, and computation results, which are required in the computation processes of the CPU 50, and an I/F 58 that acts as a medium for inputting and outputting data to and from outside devices; these are connected to each other so as to be able to receive data by a bus 59, which is a signal line for transferring the data.

An item disassembly database 60, which stores item disassembly data, a step management database 62, which stores step management data, a turntable driver 64, which drives an unillustrated turntable used as an operation table for mounting the item to be recycled, a turntable weight detector 65 for detecting the weight of the item mounted on the turntable, an image-capturing device 66 for capturing an external image of the item to be recycled that is mounted on the turntable, a display device 68 for displaying a screen based on an image signal, a radio frequency identification system (RFID) reader 71 for reading RFID tags, which are attached to each component including the item to be recycled, and a signal line for connecting to the internet 199, are connected to the I/F 58 as outside devices. The item disassembly database 60 has the same data structure as the item disassembly database 40, and the step management database 62 has the same data structure as the step management database 42.

In addition, the step S314 shown in FIG. 9 of the first embodiment is different in the present embodiment.

In step S314 of the present embodiment, it is determined whether the present step is the final step, and if not (No), in step S316, the removed component is identified by identifying the tool that was used; in step S317, it is determined whether the present step has ended (whether all the component removal operations of the present step have ended), step S316 being repeated until the present step ends. Then, when it has been determined that the present step has ended, the processing shifts to step S318.

The process in step S316 of identifying the tool that was used will be explained in detail with reference to FIG. 18. FIG. 18 is a flowchart showing the process of identifying the tool that was used. In the present embodiment, the process of identifying the used tool replaces the "process of identifying the removed component", explained in FIGS. 13 to 15 of the first embodiment.

At first, in step S500, the coordinates of a component that is to be removed are identified in the image, captured by the image-capturing device 66. Next, in step S501, the on/off status of a switch of an electric tool is input from a power detector 71A, and the position of the used tool is obtained from an image captured by the image-capturing device 66. The time which the used tool was switched on/off, and the position of the used tool, are temporarily stored. The used tool is coated beforehand with a predetermined color, and its position is identified by detecting this color in the image.

Subsequently, in steps S501 to S505 it is determined whether the electric tool has been used, based on the information that has been temporarily stored. At first, the operation is only counted as valid when there is a sequence including "off," "on", "off" the change in position between "on" and "off" is within the permitted range (the operating range shown in FIG. 16), the operating time between "on" and "off" exceeds the stipulated value (the operating time shown in FIG. 16), and the position of use from "on" to "off" matches the position of the item being operated on (the position identified in step S500) (step S506). All other statuses are deemed invalid for removing the component, in which case processing returns to step S501 and is repeated. Then, in step S507, it is determined whether the count value of the valid operation has reached the value required for carrying out the operation, and, when it has reached this value, it is determined that the operation has been carried out at that point, thereby identifying the operation that was performed.

In this way, the progress of the operation is determined by determining whether the envisaged tool to be used has been used or not, making it possible to reliably ascertain the progress of the operation.

Subsequently, the operation of the present embodiment will be explained. In the present embodiment, the processes subsequent to steps S310 and S312 are different than in the first embodiment.

That is, steps S310 and S312 are executed to identify the present step from the identified step images, and, based on the captured external image, the angle of the item to be recycled 70 mounted on the turntable 63 is determined. At this time, when the present step is not the final step, the used tool is identified to determine that the present step has ended; then, by carrying out steps S318 and S320, the identified item ID data and the item disassembly data corresponding to the present step are read from the item disassembly database 60, and the disassembly diagram is constructed based on the item disassembly data that has been read. More specifically, by performing steps S400 and S402, CAD data is extracted from the item disassembly data, and, based on the angle of the item to be recycled 70, the disassembly diagram is created from the CAD data as a front view seen from the disassembly operator. Then, in steps S406 and S410, the component data is extracted from the item disassembly data, and, based on the extracted component data, the material of the component in the disassembly diagram is indicated in the disassembly diagram. Moreover, when the component category of the component is screw, via step S414, an arrow is indicated in the disassembly diagram in accordance with the operation command direction. Then, the processes of steps S406 to S414 are carried out for all the component data contained in the item disassembly data.

Figure 18:
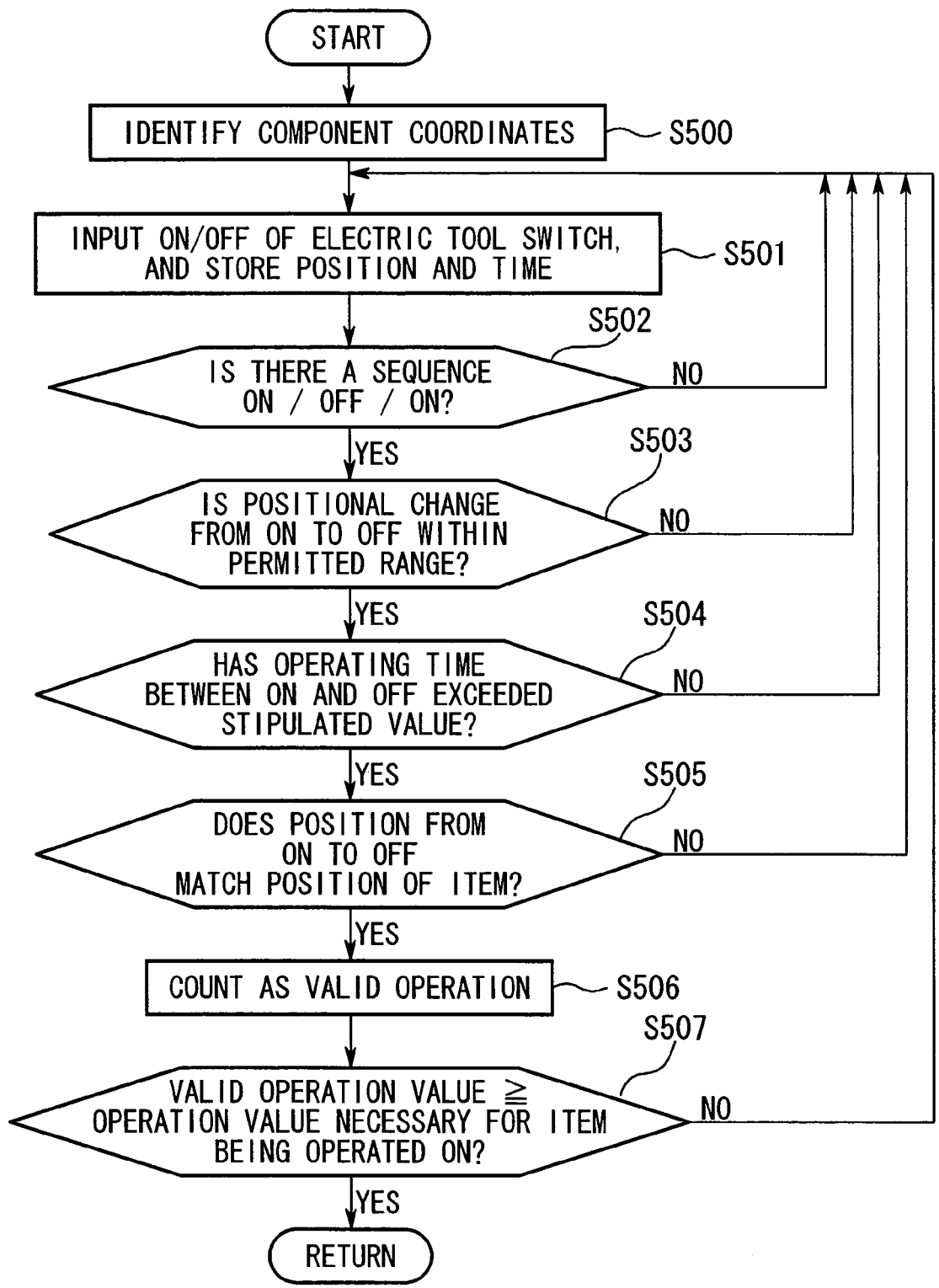
FIG. 18 is a flowchart showing a process of identifying a used tool in the second embodiment.

In the present embodiment, the control program stored beforehand in the ROM 52 is executed to perform the process shown in the flowchart of FIG. 18, but there are no restrictions on this; instead, a program showing the procedures may be read into the RAM 54 from the recording medium mentioned above.

THE THIRD EMBODIMENT

The third embodiment of the present invention will be explained with reference to FIGS. 19 to 26. The explanation of the present embodiment will concentrate mainly on its points of difference with the first embodiment described above; for this reason, features which are the same as those in the first embodiment will not be explained further. In order to clarify sections that correspond to those in the first embodiment, these sections are represented by the same reference codes.

Figure 19:
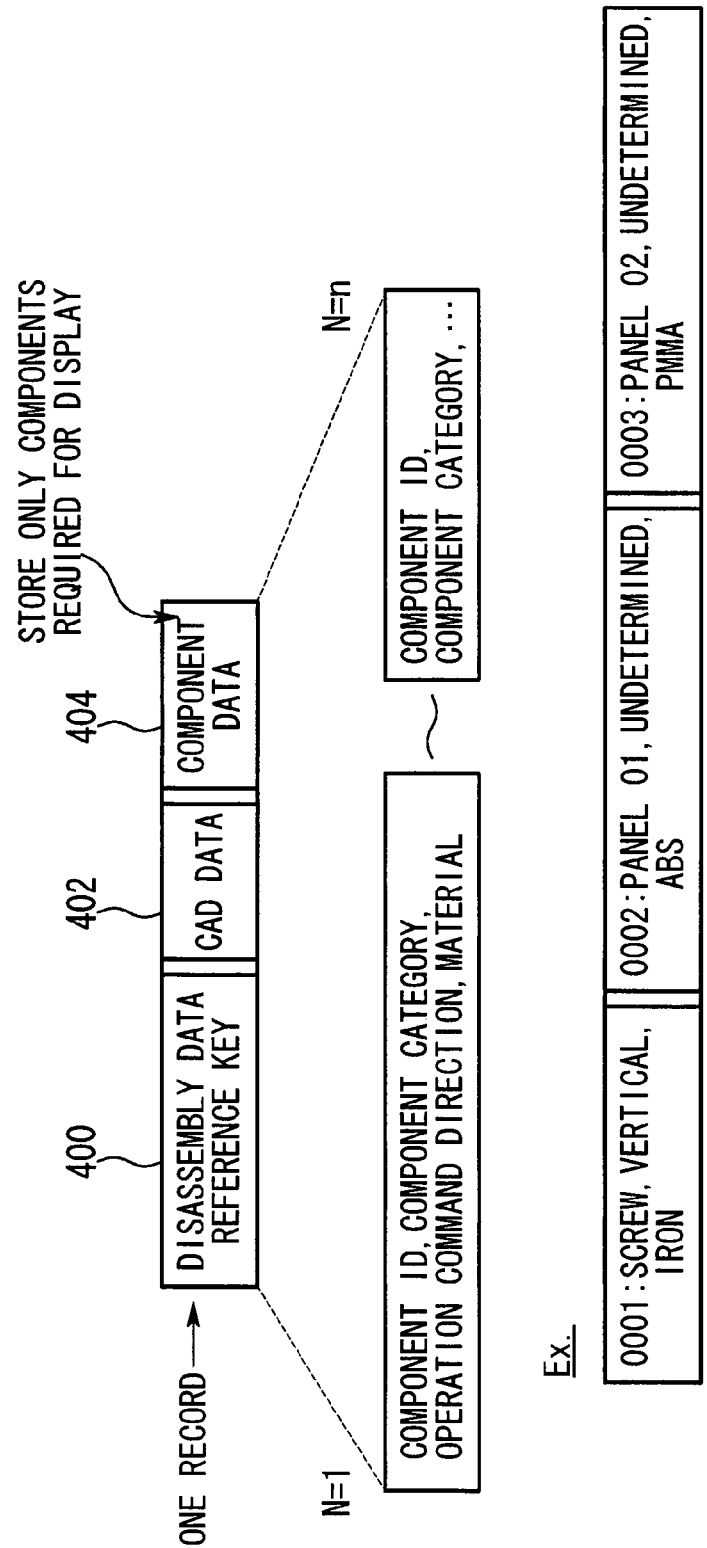
FIG. 19 is a diagram showing a third embodiment of the present invention, and shows another example of a data structure of the item disassembly database 40 shown in FIG. 2.

FIG. 19 shows the data structure of the item disassembly database 40 in the present embodiment, and corresponds to FIG. 3 in the first embodiment described above.

As shown in FIG. 19, the component data in the present embodiment relates to components that comprise the item to be recycled, and is necessary for displaying a disassembly diagram thereof; the component data for each component includes component ID, component category, operation command direction, and material. In the example shown in FIG. 19, one of the components is a screw, and in its component data has a component ID of "0001", a component category of "screw", an operation command direction of "vertical", and material of "iron".

Figure 20:
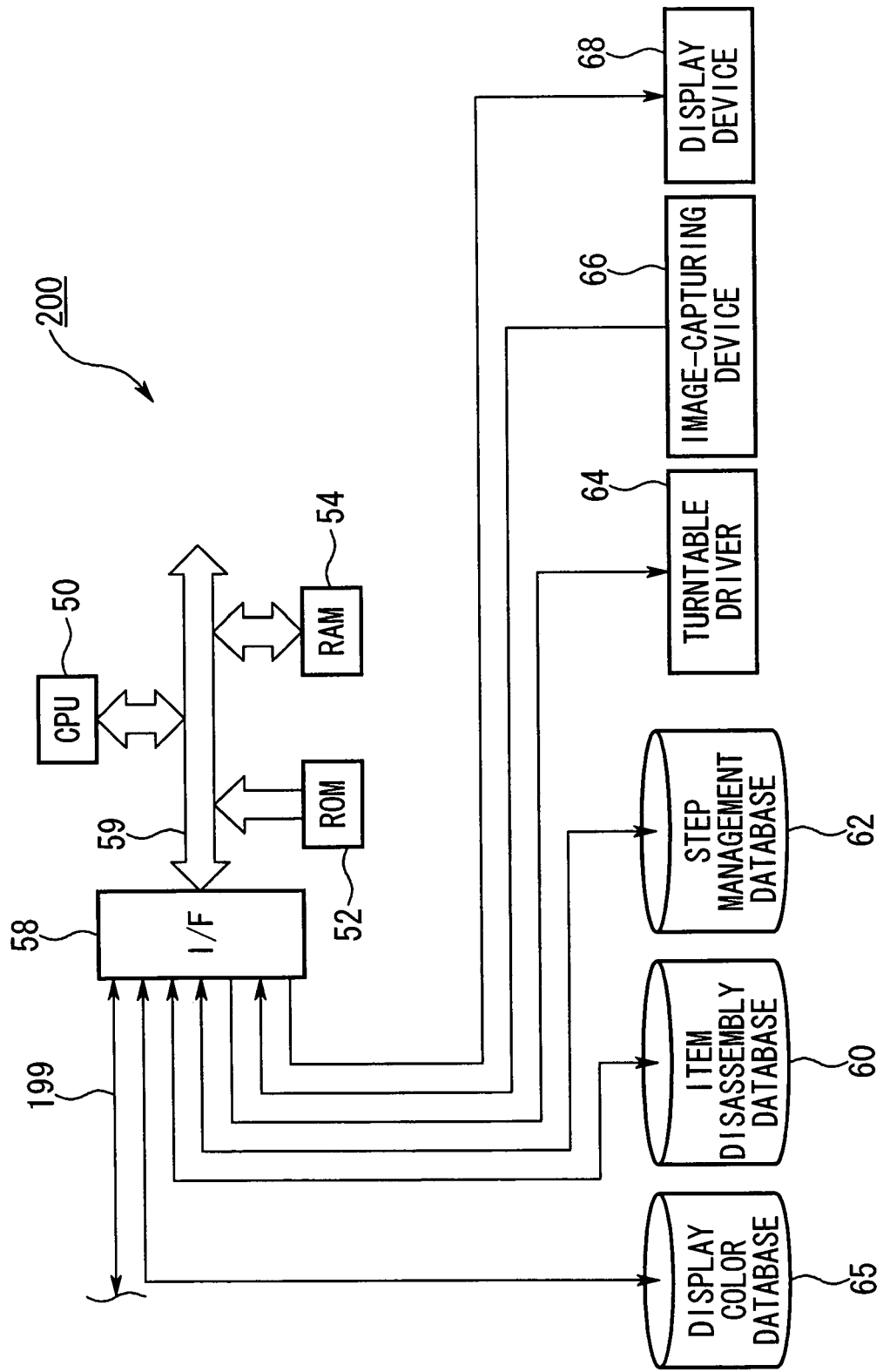
FIG. 20 is a block diagram showing another example of the constitution of the recycling center 200 shown in FIG. 2, in the third embodiment.

Subsequently, the constitution of the recycling center facility 200 in the present embodiment will be explained in detail with reference to FIG. 20. FIG. 20 is a block diagram of the constitution of the recycling center facility 200 in the present embodiment, and corresponds to FIG. 6 of the first embodiment described earlier.

As shown in FIG. 20, the recycling center facility 200 of the present embodiment comprises a CPU 50, which controls the entire system and computations based on a control program, a ROM 52, which stores control programs and the like of the CPU 50 beforehand in a predetermined region, a RAM 54 for storing data read from the ROM 52 and the like, and computation results, which are required in the computation processes of the CPU 50, and an I/F 58 that acts as a medium for inputting and outputting data to and from outside devices; these are connected to each other so as to be able to receive data by a bus 59, which is a signal line for transferring the data.

An item disassembly database 60, which stores item disassembly data, a step management database 62, which stores step management data, a turntable driver 64, which drives an unillustrated turntable used as an operation table for mounting the item to be recycled, a turntable weight detector 65 for detecting the weight of the item mounted on the turntable, an image-capturing device 66 for capturing an external image of the item to be recycled that is mounted on the turntable, a display device 68 for displaying a screen based on an image signal, a radio frequency identification system (RFID) reader 71 for reading RFID tags, which are attached to each component including the item to be recycled, and a signal line for connecting to the internet 199, are connected to the I/F 58 as outside devices. The item disassembly database 60 has the same data structure as the item disassembly database 40, and the step management database 62 has the same data structure as the step management database 42.

FIG. 21 shows the arrangement constitution of the image-capturing device 66 and the display device 68 in the present embodiment.

As shown in FIG. 21, the item to be recycled 70 is mounted on the turntable 63. Beside the turntable 63 there is provided the display device 68, which the disassembly operator views as he performs the disassembly operation. The image-capturing device 66 is attached above the display device 68, enabling it to capture an external image of the item to be recycled 70, mounted on the turntable 63. Furthermore, collecting boxes 100A and 101A for collecting the items to be recycled are provided beside an operating stand, which the turntable 63 is installed on. The collecting boxes 100A and 101A are coated with paint in predetermined colors (red and blue in this example) in accordance with their respective recycle methods.

Figure 22:
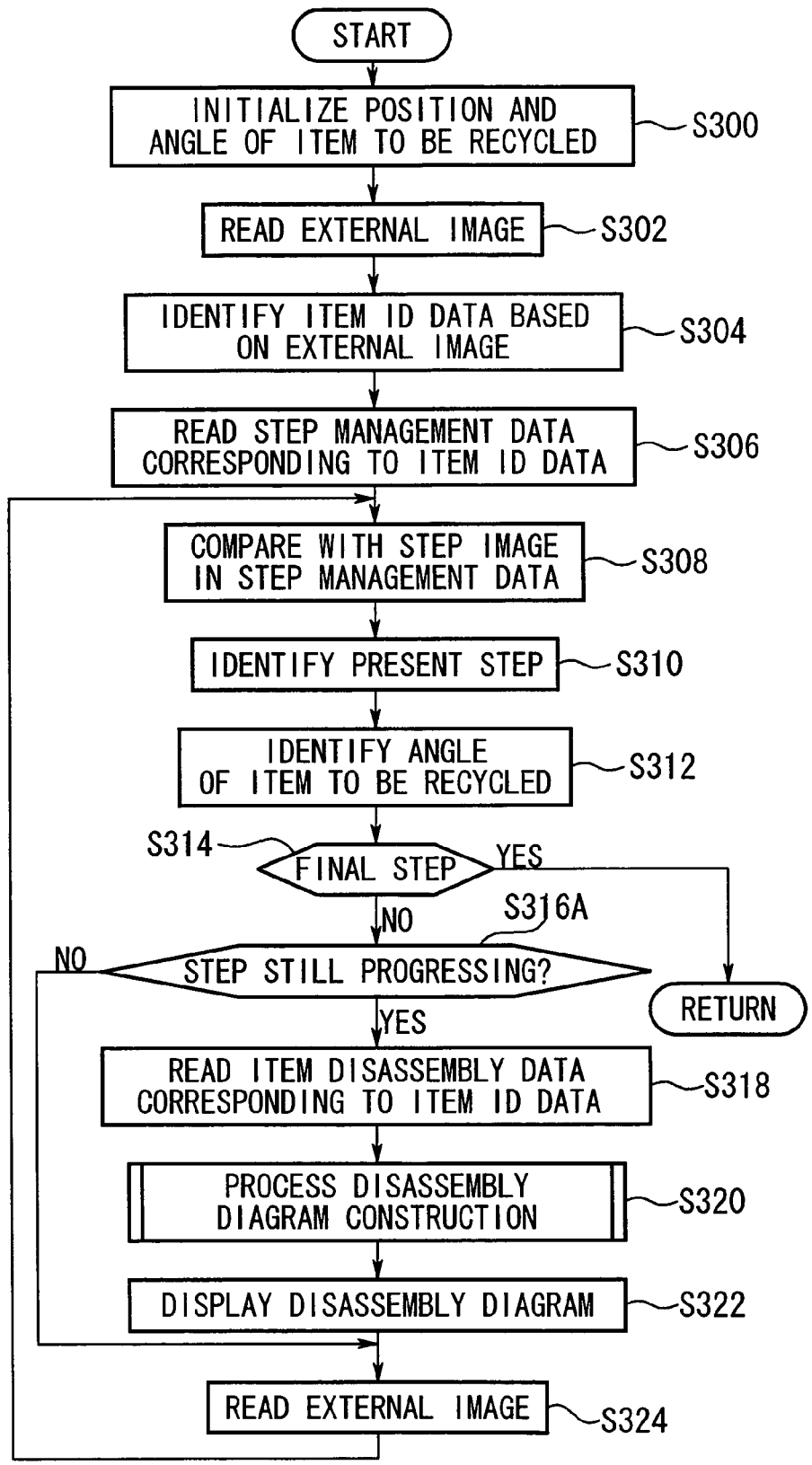
FIG. 22 is a flowchart showing a disassembly diagram display process in the third embodiment.

FIG. 22 is a flowchart showing the disassembly diagram display process.

Disassembly diagram display processing is executed at the start of the disassembly operation, and involves displaying a disassembly diagram on the display device 68 in accordance with the progress of the disassembly operation of the item to be recycled 70; as shown in FIG. 22, when the CPU 50 executes the disassembly diagram display process, it shifts to step S300.

In step S300, the CPU 50 drives the turntable driver 64, initializes the position and angle of the item to be recycled 70 mounted on the turntable 63, then shifts to step S302, in which the image-capturing device 66 captures an external image of the item to be recycled 70 mounted on the turntable 63, and then, in step S304, the item disassembly data of the item to be recycled 70 is identified based on the captured external image, and the process proceeds to step S306.

In step S306, all the step management data corresponding to the identified item disassembly data is read out from the step management database 62, and, shifting to step S308, the captured external image is compared with the step images included in the step management data which was read; step images which are identical or similar to the captured external image are identified there, and the process shifts to step S310.

In step S310, the present step is identified from the identified step images, and, in step S312, the angle of the item to be recycled 70 mounted on the turntable 63 is identified from the external images captured in steps S302 and S304, and the processing proceeds to step S314.

In step S314, it is determined whether the present step is the final step; when the present step is not the final step (No), proceeding to step S316A, it is determined whether the present step is different with the former step based on the former determination result, and when it is identified that the present step is different with the former step (Yes), processing proceeds to step S318.

In step S318, the identified item disassembly data and the item disassembly data corresponding to the present step are read from the item disassembly database 60, and, shifting to step S320, the disassembly diagram construction process for construct a disassembly diagram is executed based on the item disassembly data that was read; then, in step S322, the constructed disassembly diagram is displayed on the display device 68, and, shifting to step S324, the image-capturing device 66 captures an external image of the item to be recycled 70 mounted on the turntable 63, and processing shifts to step S308.

On the other hand, in step S316, when it is determined that the previous step and the present step are the same (No), processing shifts to step S324.

On the other hand, in step S314, when it is determined that the present step is the final step (Yes), one series of processes ends and the CPU 50 returns to its original processing.

Subsequently, the disassembly diagram display process of step S320 will be explained in detail with reference to FIG. 23.

Figure 23:
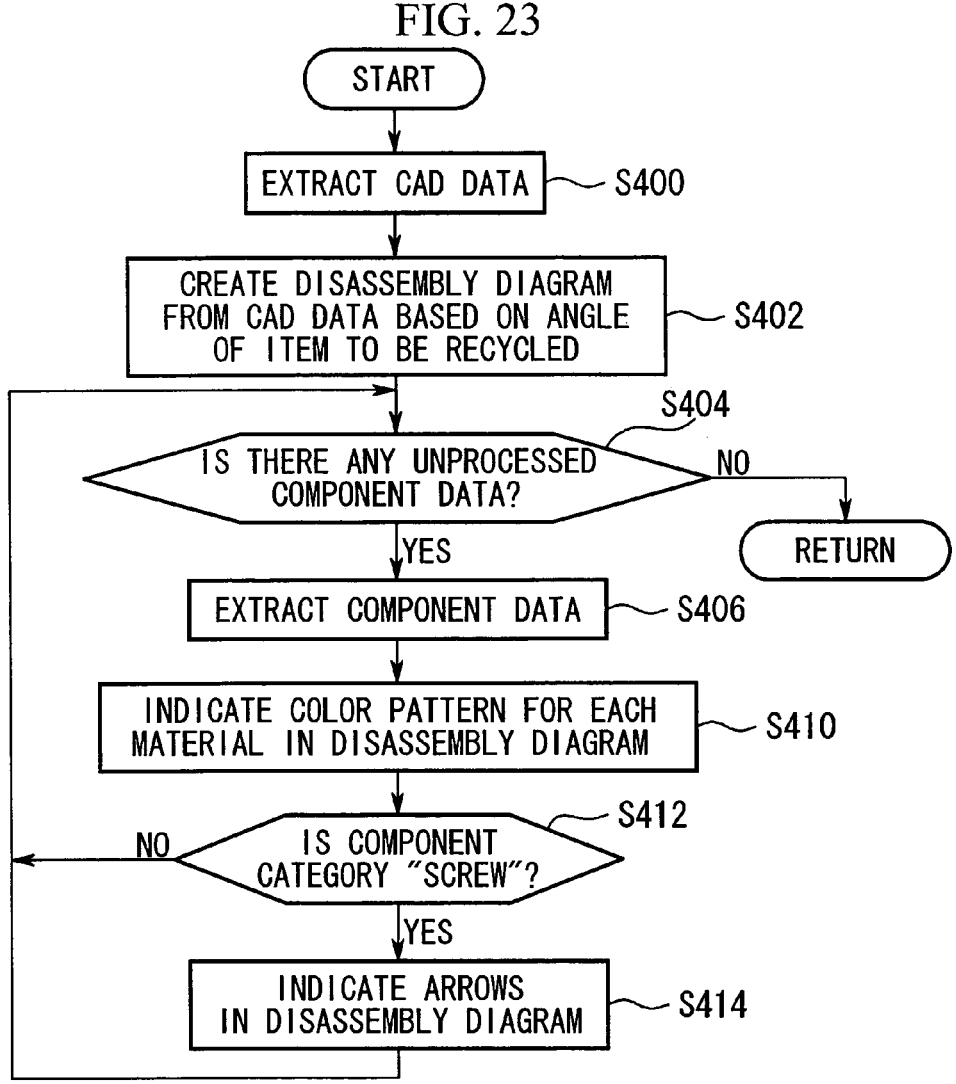
FIG. 23 is a flowchart showing a disassembly diagram display process in the third embodiment.

FIG. 23 is a flowchart of the disassembly diagram display process.

As shown in FIG. 23, upon executing the disassembly diagram construction process in step S320 described above, the processing sequence at first shifts to step S400.

In step S400, the CAD data is extracted from the item disassembly data that was read in step S318, and, shifting to step S402, based on the angle of the item to be recycled 70 identified in step S312, a disassembly diagram including a front view seen from the disassembly operator is created from the CAD data, and the processing shifts to step S404.

In step S404, it is determined whether the item disassembly data, which has been read, contains any unprocessed component data, and if so (Yes), processing shifts to step S406, where the unprocessed component data is extracted from the item disassembly data, and then, in step S410, based on the extracted component data, the material of the component in the disassembly diagram (the component relating to the component data that was read) is indicated in the disassembly diagram. At this time, the materials are indicated by material names (PMMA, ABS, etc.), display patterns that are determined beforehand for each material, and display colors that are determined beforehand for each recycle processing method.

Figures 25, 26:
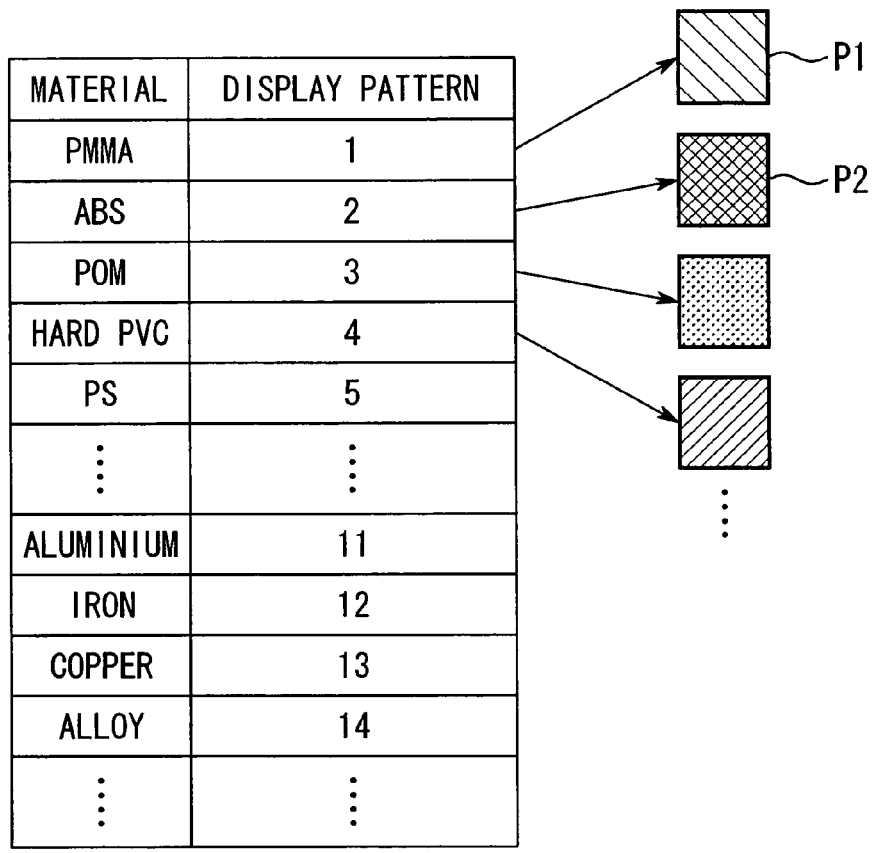
FIG. 25 is a diagram showing the table constitution of a display color 65 shown in FIG. 20, in the third embodiment.
FIG. 26 is a diagram showing the table constitution of a display color 65 shown in FIG. 20, in the third embodiment.

The table constitution of the display color database 65 will be explained with reference to FIGS. 25 and 26. FIG. 25 is a display pattern table, in which the materials are listed in correspondence with their display patterns. The materials stored beforehand here are those defined in the component data 404 shown in FIG. 19, and include materials which may be used in constructing the item to be recycled. The display patterns define the display methods for visually identifying differences in the materials when the components of the item to be recycled are displayed on the display device 68. As shown in FIG. 25, the number of display patterns matches the number of materials, so that PMMA (acryl) has a display pattern of diagonal lines at 45 degrees (the pattern shown by reference code P1 in FIG. 25), ABS (ABS resin) has a display pattern of grid-like lines (the pattern shown by reference code P2 in FIG. 25), and so on.

FIG. 26 is a display color table, in which the recycle processing methods are listed in correspondence with the display colors and the materials. The recycle processing methods define how a disassembled item should be processed; for example, "pulverize and reuse", "send to recycle operator", "destroy", and such like, the recycle processing method for each material being determined beforehand. The display colors are used in visually identifying differences in the materials when the components of the item to be recycled are displayed on the display device 68. The display colors match the colors of the collecting boxes 100A and 101A shown in FIG. 21, the collecting box 100A being painted the same color as the display color of processing method A (red), and the collecting box 101A being painted the same color as the display color of processing method B (blue).

By referring to these two tables, a component comprised of material PMMA is displayed on the display device 68 in red color, with the display pattern indicated by the reference code P1 of FIG. 25.

In step S412, it is determined whether the component category is screw; when the component category is determined to be screw (Yes), processing proceeds to step S414, where an arrow is indicated in the disassembly diagram in accordance with the operator command direction, and the process shifts to step S404.

On the other hand, when it is determined in step S412 that the component category is not screw (No), the process shifts to step S404.

On the other hand, when it is determined in step S404 that there is no unprocessed component data in the item disassembly data that has been read (No), this series of processes ends and the CPU 50 returns to its original processing.

Subsequently, the operation of the present embodiment will be explained.

At the recycling center 20, prior to disassembling the item to be recycled 70, the disassembly operator mounts the item to be recycled 70 on the turntable 63 in order to obtain item disassembly data, and captures an external image of the item to be recycled 70 by using the image-capturing device 66.

At the recycling center facility 200, when the external image of the item to be recycled 70 is captured, the item ID data of the item to be recycled 70 is identified based on the captured external image by following the steps S202 to S206, and the identified item ID data is transmitted to the data management center facility 100 together with an extraction request.

When the item ID data and the extraction request are received at the data management center facility 100, by executing step S104, all the item disassembly data corresponding to the item ID data are retrieved from the item disassembly database 40 based on the received item ID data. As a result, when the item disassembly data is retrieved, steps S108 and S110 are performed to read all the step management data corresponding to the retrieved item disassembly data from the step management database 42, and the retrieved item disassembly data and the read step management data are transmitted to the recycling center facility 200.

When the recycling center facility 200 receives the item disassembly data and the step management data, steps S210 and S212 are performed so as to store the received item disassembly data in correspondence with the item ID data in the item disassembly database 60, and the received step management data is similarly stored in correspondence with the item ID data in the step management database 62. Consequently, the disassembly operator at the recycling center facility 200 is able to obtain the necessary item disassembly data and step management data.

Subsequently, at the recycling center 20, the disassembly operator uses the image-capturing device 66 to capture an external image of the item to be recycled 70 mounted on the turntable 63.

At the recycling center facility 200, when the external image of the item to be recycled 70 is captured, the steps S304 and S306 are carried out to identify the item ID data of the item to be recycled 70 based on the captured external image, and all the step management data corresponding to the identified item ID data are read from the step management database 62. Next, in step S308, the external image that has been captured is compared with the step images contained in the step management data that was read, and the image data, which is identical or similar to the captured external image, is identified therefrom.

Subsequently, steps S310 and S312 are executed to identify the present step from the identified step images, and, based on the captured external image, the angle of the item to be recycled 70 mounted on the turntable 63 is determined. At this time, when the present step is not the final step, the removed component is identified to determine that the present step has ended; then, by carrying out steps S318 and S320, the identified item ID data and the item disassembly data corresponding to the present step are read from the item disassembly database 60, and the disassembly diagram is constructed based on the item disassembly data that has been read. More specifically, by performing steps S400 and S402, CAD data is extracted from the item disassembly data, and, based on the angle of the item to be recycled 70, the disassembly diagram is created from the CAD data as a front view seen from the disassembly operator. Then, in steps S406 and S410, the component data is extracted from the item disassembly data, and, based on the extracted component data, the material of the component in the disassembly diagram is indicated in the disassembly diagram. Moreover, when the component category of the component is "screw", via step S414, an arrow is indicated in the disassembly diagram in accordance with the operation command direction. Then, the processes of steps S406 to S414 are carried out for all the component data contained in the item disassembly data.

Figure 24:
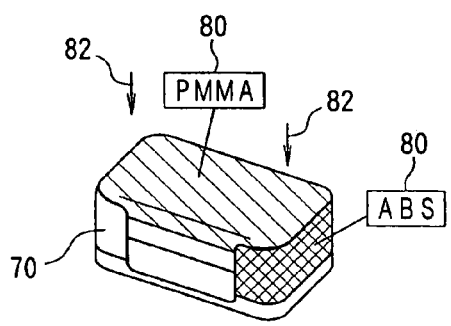
FIG. 24 is a flowchart showing a disassembly diagram display process in the third embodiment.

FIG. 24 is a diagram showing one example of a disassembly diagram. In the example of FIG. 24, a material numeral 80 is appended to the component including the item to be recycled 70, and display patterns (display patterns 1 and 2) and a display color (red) are displayed as defined by the materials. In addition, arrows 82 indicating the operation command direction are appended to the screw, which comprises the item to be recycled 70. Incidentally, reference code "PMMA" of the material numeral 80 represents acryl, and "ABS" represents ABS resin.

At the recycling center facility 200, when the disassembly diagram is constructed, steps S322 and S324 are carried out to display the constructed disassembly diagram on the display device 68; the disassembly operator performs the disassembly operation while viewing the contents of the display, and delivers the removed component into the collecting box having the same color as the display color displayed in the disassembly diagram. Then, the processes of re-capturing the external image of the item to be recycled 70 (steps S308 to S324) are repeated until the final step of the disassembly operation.

When displaying the disassembly diagram on the display device 68, in addition to its predetermined display pattern and predetermined color, the item to be recycled may be displayed in flashing light. Further, in addition to displaying it on the display device 68, an unillustrated speaker may be provided for reproducing audio sound giving the names of the materials. These measures enable the component to be classified more accurately.

The present embodiment describes a case where a control program is stored beforehand in the ROM 52, and is used to execute the processes of the flowcharts shown in FIGS. 22 and 23, but the present invention is not restricted to such a constitution; instead, a program illustrating the processes may be stored on an unillustrated recording medium and read to the RAM 54.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A recycling facilitating system which facilitates disassembly of an item to be recycled, comprising:
   an item identification data input unit, through which item identification data for identifying the item to be recycled is input;
   an item disassembly data memory, which stores item disassembly data for constructing a plurality of different disassembly diagrams showing steps of disassembling the item to be recycled in correspondence with the item identification data;
   an item disassembly data retrieval unit, which retrieves the item disassembly data from the item disassembly data memory based on the item identification data that was input by the item identification data input unit;
   a disassembly diagram constructing unit, which constructs the disassembly diagram based on the item disassembly data that was retrieved by the item disassembly data retrieval unit; and
   a disassembly diagram output unit, which outputs the disassembly diagram that was constructed by the disassembly diagram constructing unit,
   wherein the disassembly diagram constructing unit determines progress status of an operation step of disassembling the item to be recycled by identifying a component that was removed during the operation step, and, in accordance with the progress status which was identified, constructs one of a plurality of disassembly diagrams, which can be constructed from the item disassembly data that was retrieved by the item disassembly data retrieval unit.

2. The recycling facilitating system according to claim 1, wherein the removed component being identified by comparing an image of the removed component with an image created from CAD data of candidate components.

3. The recycling facilitating system according to claim 1, wherein the removed component is identified by detecting a reduction in weight of the item to be recycled, and comparing a weight corresponding to the reduction with weights of candidate components.

4. The recycling facilitating system according to claim 1, wherein the removed component is identified by reading component identification written in an RFID tag appended to the removed component.

5. A recycling facilitating method which facilitates disassembly of an item to be recycled, comprising the steps of:
   inputting item identification data for identifying the item to be recycled;
   storing item disassembly data for constructing a plurality of different disassembly diagrams showing steps of disassembling the item to be recycled in correspondence with the item identification data;
   retrieving the item disassembly data in a data stored in the step of storing item disassembly data, based on the item identification data that was input in the step of inputting item identification data;
   constructing the disassembly diagram based on the item disassembly data retrieved in the step of retrieving the item disassembly data; and
   outputting the constructed disassembly diagram constructed in the step of constructing the disassembly diagram,
   wherein the step of constructing the disassembly diagram comprising determining progress status of an operation step of disassembling the item to be recycled, by identifying a component that was removed during the operation step, and, in accordance with the progress status which was identified, constructing one of a plurality of disassembly diagrams, which can be constructed from the item disassembly data that was retrieved in the step of retrieving the item disassembly data.

6. A recycling facilitating program which facilitates disassembly of an item to be recycled, comprising the processes of:
   inputting item identification data for identifying the item to be recycled;
   storing item disassembly data for constructing a plurality of different disassembly diagrams showing steps of disassembling the item to be recycled in correspondence with the item identification data;
   retrieving the item disassembly data in a data stored in the process of storing item disassembly data, based on the item identification data that was input in the process of inputting item identification data;
   constructing the disassembly diagram based on the item disassembly data retrieved in the process of retrieving the item disassembly data; and
   outputting the constructed disassembly diagram constructed in the process of constructing the disassembly diagram,
   wherein the process of constructing the disassembly diagram comprising determining progress status of an operation step of disassembling the item to be recycled, by identifying a component that was removed during the operation step, and, in accordance with the progress status which was identified, constructing one of a plurality of disassembly diagrams, which can be constructed from the retrieved item disassembly data that was retrieved in the process of retrieving the item disassembly data.

* * * * *